United States Patent [19]

Ishii et al.

[11] Patent Number: 5,410,477
[45] Date of Patent: Apr. 25, 1995

[54] CONTROL SYSTEM FOR AN AUTOMOTIVE VEHICLE HAVING APPARATUS FOR PREDICTING THE DRIVING ENVIRONMENT OF THE VEHICLE

[75] Inventors: Junichi Ishii, Katsuta; Hiroshi Ohnishi, Hitachi; Nobuo Kurihara, Hitachiota, all of Japan

[73] Assignee: Hitachi, Ltd., Tokyo, Japan

[21] Appl. No.: 854,344

[22] Filed: Mar. 19, 1992

[30] Foreign Application Priority Data

Mar. 22, 1991 [JP] Japan ................................. 3-081154

[51] Int. Cl.⁶ ...................... G06F 15/20; G06F 15/46
[52] U.S. Cl. .......................... 364/424.01; 364/431.04; 395/905
[58] Field of Search ................... 364/424.01, 424.03, 364/424.05, 431.04, 431.05, 424.04; 395/10, 11, 22, 905, 912; 73/117.2, 117.3

[56] References Cited

U.S. PATENT DOCUMENTS

| | | | |
|---|---|---|---|
| 5,021,958 | 6/1991 | Tokoro ........................... | 364/426.04 |
| 5,084,821 | 1/1992 | Ohsuga et al. ................. | 364/424.05 |
| 5,091,965 | 2/1992 | Kobayashi et al. ............ | 382/15 |
| 5,142,612 | 8/1992 | Skeirik .......................... | 364/151 |
| 5,159,660 | 10/1992 | Lu et al. ....................... | 364/148 |
| 5,162,997 | 11/1992 | Takahashi ..................... | 364/424.05 |
| 5,189,617 | 2/1993 | Shiraishi ....................... | 364/424.05 |
| 5,189,621 | 2/1993 | Onari et al. ................... | 364/431.04 |
| 5,200,898 | 4/1993 | Yuhara et al. ................. | 364/431.05 |

FOREIGN PATENT DOCUMENTS

| | | |
|---|---|---|
| 0304089 | 10/1987 | European Pat. Off. . |
| 3314800 | 10/1984 | Germany . |
| 3534216 | 4/1987 | Germany . |
| 3715423 | 11/1987 | Germany . |
| 6453047 | 3/1989 | Japan . |
| 1-113561 | 5/1989 | Japan . |
| 2-37015 | 2/1990 | Japan . |

OTHER PUBLICATIONS

Techno Japan, "Fuzzy Control of Automobile Speed", vol. 23, No. 3, Mar. 1990.

Primary Examiner—Kevin J. Teska
Assistant Examiner—Tan Q. Nguyen
Attorney, Agent, or Firm—Antonelli, Terry, Stout & Kraus

[57] ABSTRACT

A total control system for an automotive vehicle assures vehicular behavior precisely following to a driver's demand for variation of driving environment and provide smooth transition in variation of the driving environment. The system includes a driving environment index predicting section predicting vehicular driving environment on the basis of a driving operation indicative amount, such as an accelerator depression magnitude, a brake depression magnitude, a steering angular position and so forth and a vehicular condition indicative amount, such as an engine speed, a vehicle speed, a longitudinal acceleration and so forth. Based on the driving environment index derived by the predicting section, local control channels of the automotive vehicle are controlled. The driving environment index predicting section predicts the driving environment index by neural network or so forth to transfer to the local control channels though a vehicular local area network or a common memory. Accordingly, variable control corresponding to the driving environment in the local control channels can be realized.

19 Claims, 26 Drawing Sheets

CONTROL SYSTEM FOR AN AUTOMOTIVE VEHICLE HAVING APPARATUS FOR PREDICTING THE DRIVING ENVIRONMENT OF THE VEHICLE

BACKGROUND OF THE INVENTION

The present invention relates generally to a control system for an automotive vehicle. More specifically, the invention relates to a concentrated control system for an automotive vehicle suitable for a vehicle having a plurality of local control channels for an automatic power transmission, various engine control systems and so forth, which local control channels are designed to be controlled by electric control signals.

Objects to be controlled in the automotive vehicle are separated in a plurality of local control channels, such as for automatic power transmission control, engine control and so forth. In the conventional automatic transmission control system, for example, gear position is fixedly selected as a point on a two dimensional coordinate system which has one coordinate axis established in terms of a throttle valve open angle reflecting a torque demand and the other coordinate axis established in terms of a vehicle speed reflecting vehicle driving condition.

Among various automatic transmission control systems, there are some systems which have variable shifting point by selecting one of a plurality of shifting characteristics modes, such as power/economy and so for through manual operation of drivers through mode selector button and the like. Even in such type of the automatic transmission control system, selectable shifting criteria (shifting lines) are those sets for power mode and economy mode and cannot be varied sequentially between the shifting lines. Namely, in the above-mentioned type of the local control systems, fixed characteristics of controls are performed irrespective of the vehicular driving environmental condition.

Relevant arts associated with this technology can be seen in Japanese Unexamined Patent Publication (Kokai) No. 64-53047, Japanese Unexamined Patent Publication No. 1-113561 and Japanese Unexamined Patent Publication No. 2-37015, for example.

In the prior art, there is a problem in that, the local control channels are not established for sequentially variable control characteristics depending upon the vehicular driving environmental condition, and thus cannot precisely follow intended variation of the vehicular driving environmental condition as demanded by the driver and realize smooth variation of the control characteristics corresponding to the driver's demands or intent.

SUMMARY OF THE INVENTION

It is an object of the present invention to provide a concentrated control system for an automotive vehicle which can realize variable controls in local control channels precisely adapted to vehicular driving environmental condition and thus assures optimization of vehicle driving behavior.

According to the present invention, an environmental index predicting (estimating) section is provided for predicting (estimating) vehicular driving environmental condition on the basis of a driving operational magnitude associated with vehicular motion, such as signals indicative of an accelerator depression angle, a brake depression force, a steering angular position and so forth, and a vehicular driving condition indicative amount, such as an engine speed, a vehicle speed, a longitudinal acceleration and so forth. The environmental index predicting section generates a driving environment indicative index based on the results of prediction so that control operation is performed on the basis thereon in the local control channels.

For recognition of vehicular driving environmental condition, the operational magnitude indicative amount or parameter, or vehicular condition indicative amount or parameter, or, in the alternative the predicted (estimated) values thereof, is input to the environmental index predicting section to derive the vehicle driving environment indicative index. The environmental index predicting section performs prediction of the vehicle driving environment indicative index by means of a neural network or so forth. The vehicular driving environment indicative index thus derived is distributed for the vehicular local control channels through a transfer medium, such as a vehicular local area network and a common memory. The local control channel utilizes the vehicle driving environment indicative index received through the transfer medium to perform control with variable control characteristics. Through the process set forth above, local control channels with variable control characteristics adapted to the vehicle driving condition can be realized.

DESCRIPTION OF THE PREFERRED EMBODIMENT

A concentrated control system for an automotive vehicle, according to the present invention, will be discussed in detail in terms of embodiments illustrated in the accompanying drawings.

Figure 1:
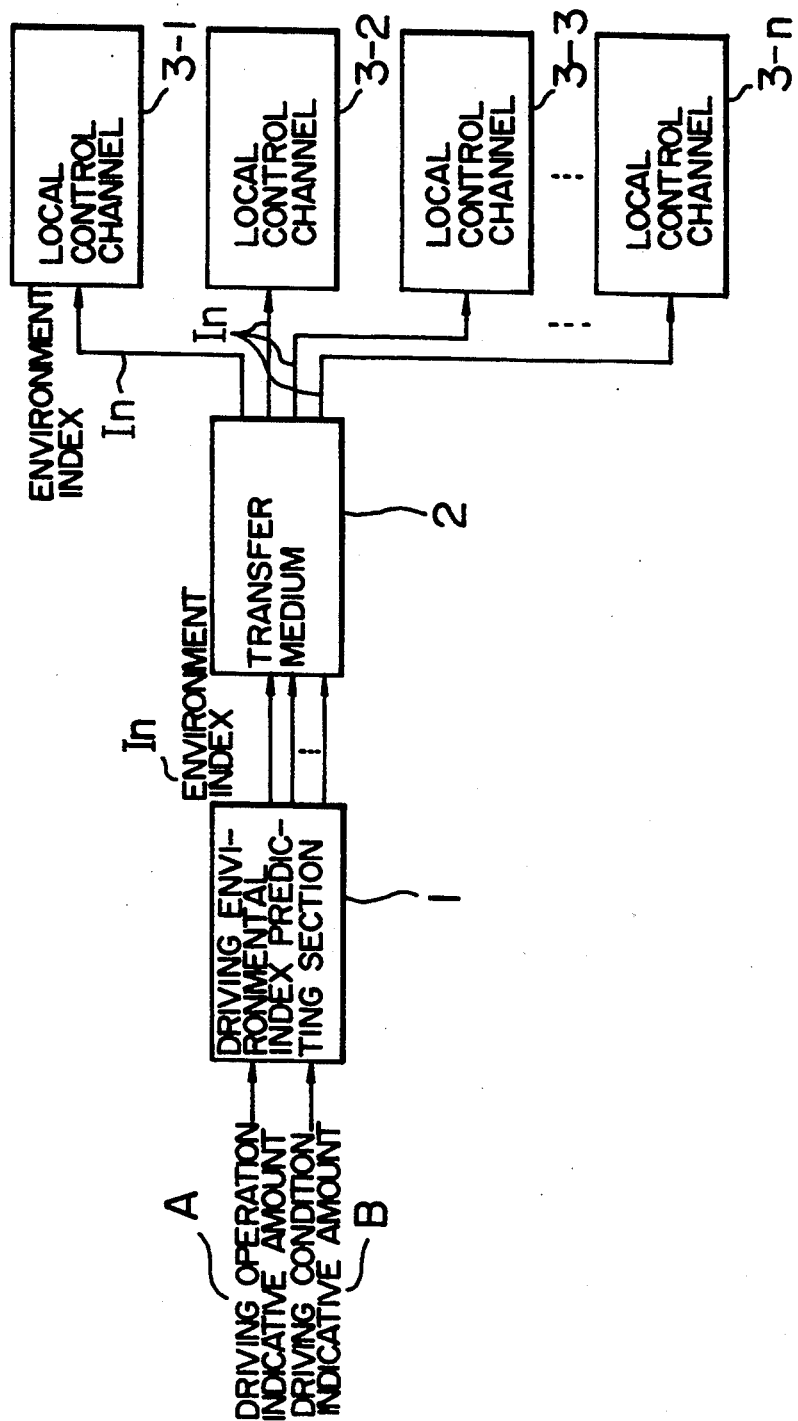
FIG. 1 is a schematic block diagram showing one embodiment of a concentrated control system for an automotive vehicle according to the present invention.

FIG. 1 is a functional block diagram of one embodiment of an automotive concentrated control system according to the invention. As shown, a driving environmental index predicting (estimating) section 1 generates a driving environment indicative index In and transfers the environmental indicative index In to a plurality of local control channels (subsystems) 3-1, 3-2, 3-3 ... 3-n through a transfer medium 2. The local control channels as generally referred to will be represented by the reference numeral "3". As a result, respective local control channels 3-1 through 3-n perform variable controls for respective channels on the basis of the received driving environment indicative index In.

The driving environmental index predicting section 1 receives a driving operational amount A or a driving condition parameter B depending upon necessities therefor. Here, the driving operational amount A can be an accelerator pedal depression angle, a brake pedal depression angle (force), a steering angular position and so forth, for example. On the hand, the vehicular driving condition parameter B can be an engine speed, a vehicle speed, an acceleration in vertical, lateral and/or longitudinal acceleration and so forth.

The transfer medium 2 represents a transfer medium connecting the driving environmental index predicting section 1 and the local control channels 3-1 through 3-n. As shown in FIG. 1, when the local control channel 3 includes a plurality of control channels, the transfer medium 2 may comprise a local area network interconnecting the respective control channels. In the alternative, in case that the control channel 3 is established for performing control under a common central processing system, the transfer medium 2 may comprise a memory connected through bus lines.

Figure 2:
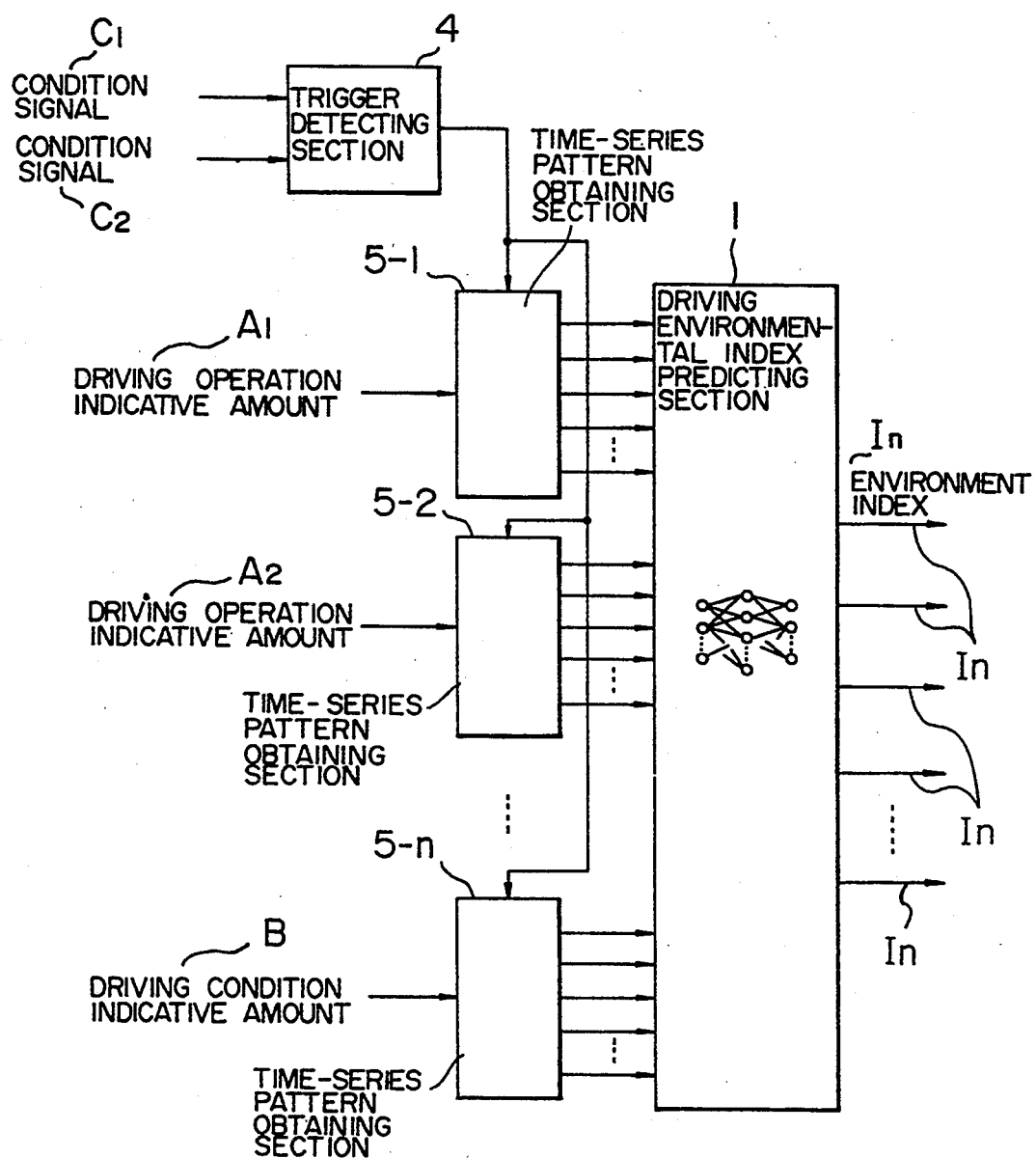
FIG. 2 is a block diagram showing signal input system for a driving environmental index predicting (estimating) section in one embodiment of the invention.

FIG. 2 shows the detailed construction of the driving environmental index predicting section 1 with the construction of the input section thereof. In the shown embodiment, the driving environmental index predicting section 1 comprises a neural network. The neural network is designed to be responsive to variation patterns for respective driving operational amounts A1, A2 ... or the driving condition indicative parameter B in time series to receive those inputs through time-series pattern obtaining sections 5-1, 5-2, ... 5-n for sampling. Sampling of inputs in time series is performed in synchronism with a trigger signal from a trigger detecting section 4. The trigger signal is generated in response to condition signals C1 and C2. For example, when the accelerator pedal depression angle is employed as the condition signal C1, the neural network synchronous with acceleration and deceleration of the vehicle can be established.

It should be noted that although driving environment is predicted by pattern recognition of dynamic signals through a process of establishing time-series pattern in the shown embodiment, it is possible to perform pre-process of respective signals and preliminarily extract features of the signals and then input them to the neural network.

Figure 3A:
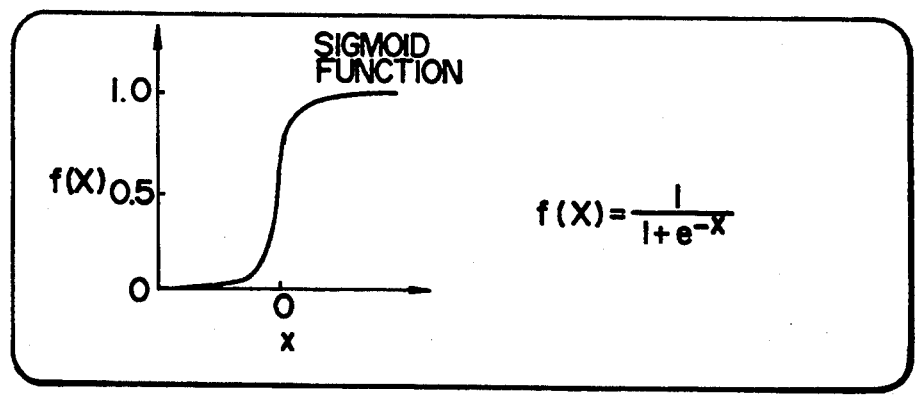
FIGS. 3A and 3B are explanatory illustrations of a neural network employed in one embodiment of the invention.
Figure 3B:
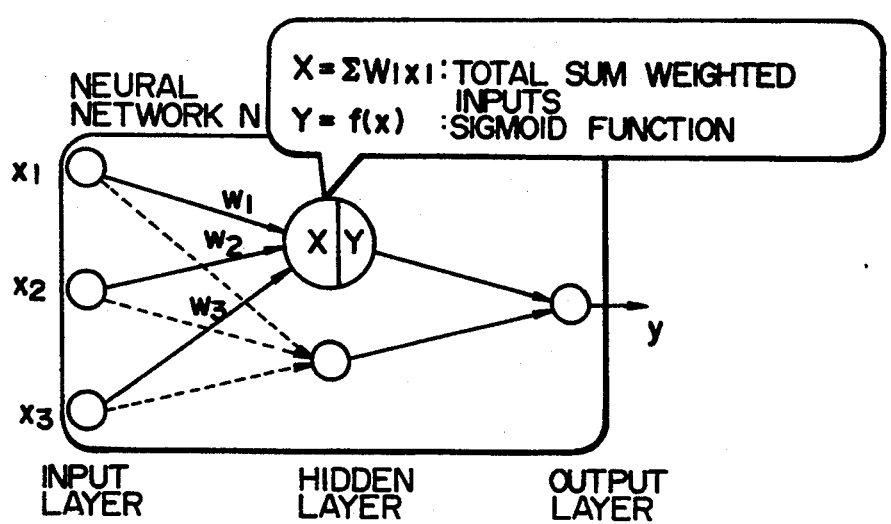

Here, brief discussion will be given for the neural network employed in the shown embodiment of the invention. As is well known, the neural network is a network which simulates neuron in a human brain. As shown in FIGS. 3A and 3B, a plurality of units are composed in a neural network N interconnected through synapses. In the shown case, the input X(X1, X2, X3) for the unit becomes a weighted total sum derived by multiplying the input values with weighting values of synapses.

With respect to this input, the unit X provides an output according to Sigmoid function Y. This is a function which swiftly approach to 1 when input X exceeds 0, and the characteristics of the function determines the characteristics of the neuron in the brain. It should be noted that the neural network illustrated in FIGS. 3A and 3B is so-called Ramelhart type to transfer the signal through an input stage (layer), an intermediate stage (hidden layer) to an output stage (layer).

Figure 4:
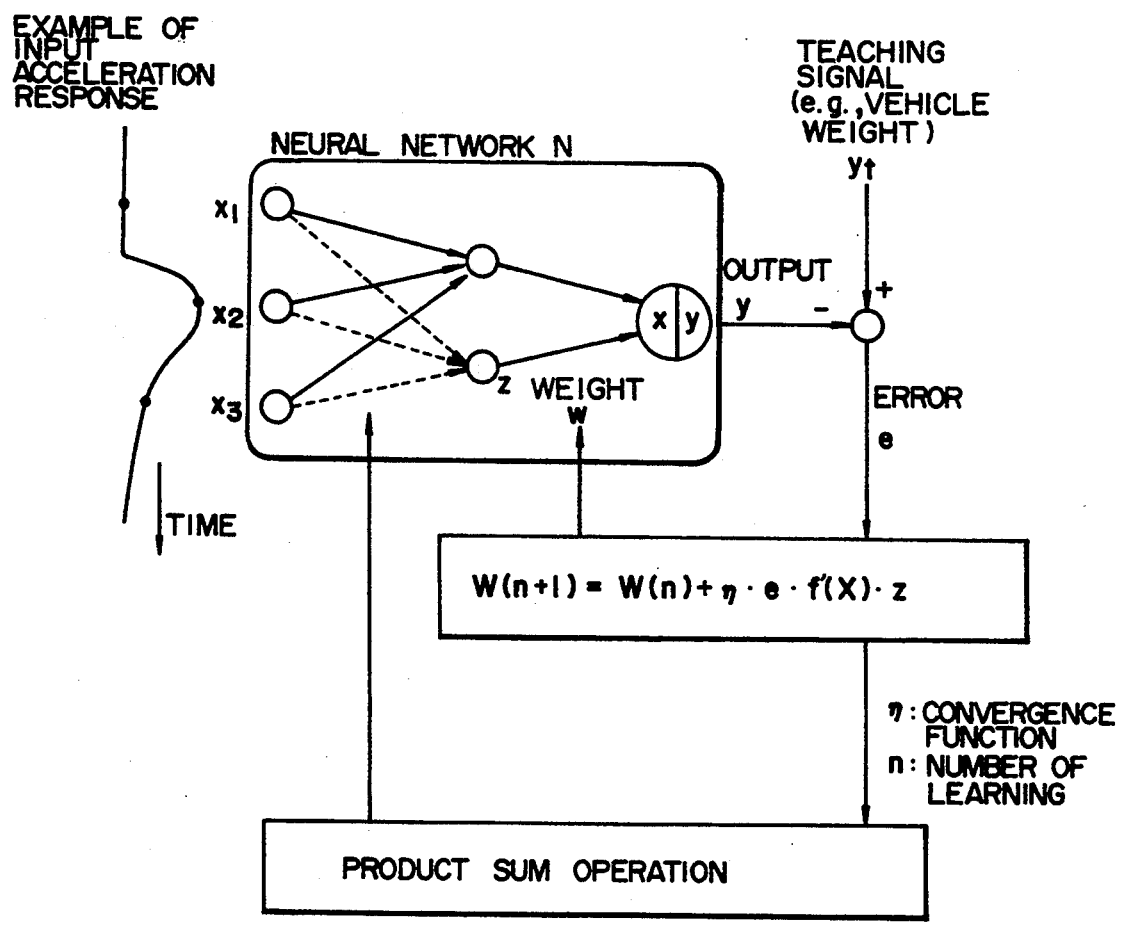
FIG. 4 is an explanatory illustration of a neural network employed in one embodiment of the invention.

As shown in FIG. 4, the neural network N is established for supervised learning in back propagation to lean weight of synapse so that the output signal as a teaching signal (desired value) for the input signal can be obtained. In normal case, several thousands times of learning by back propagation is required. On the other hand, once learning of weight of synapse is completed, the period required for arithmetic operation for deriving output with respect to input becomes shorter than that during learning.

Figure 5:
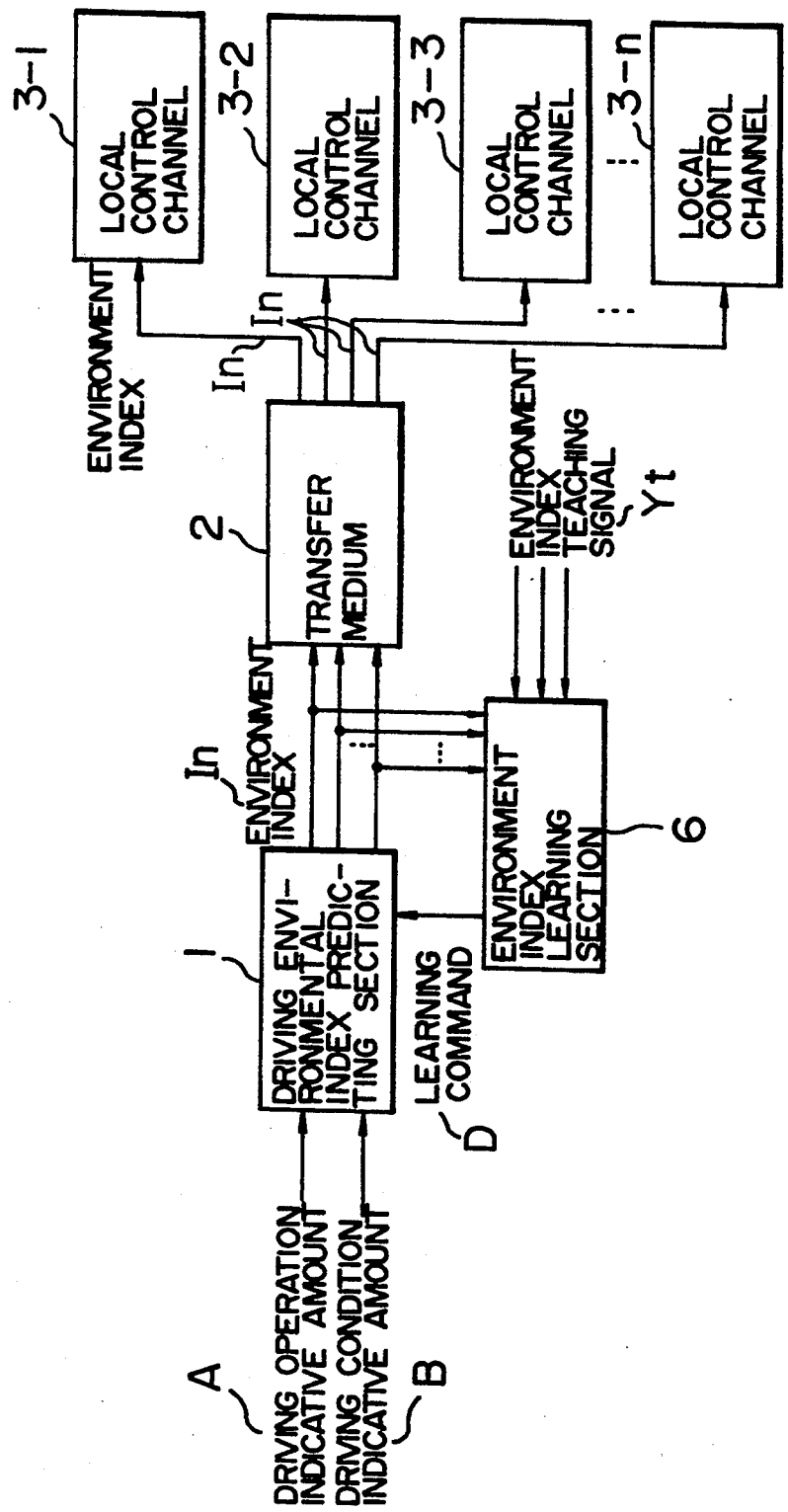
FIG. 5 is schematic block diagram of another embodiment of a concentrated control system for an automotive vehicle according to the invention.

FIG. 5 shows one embodiment of the invention, in which an environment index learning section 6 is incorporated. A teaching (supervisor) signal Yt for the environment indicative index is provided for the environment index learning section 6. The environment index learning section 6 calculates a different between the environment index indicated by the teaching signal Yt and an environment index In actually generated to learn the weight of neural network according to learning algorithm of back propagation in the neural network N.

Accordingly, in the shown embodiment, on-line back propagation learning becomes possible so that the neural network can be established and used while the vehicle travels.

Figure 6:
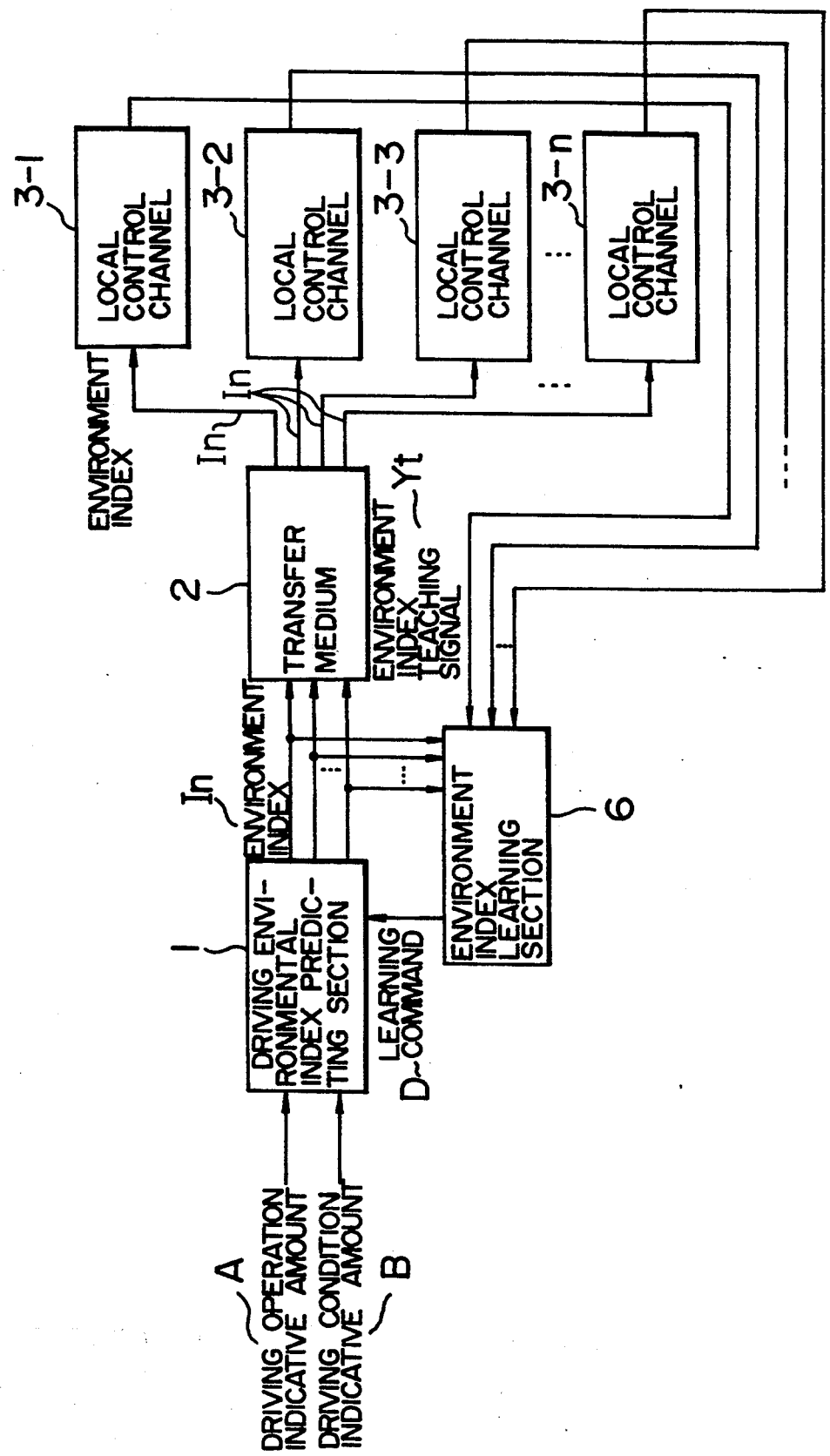
FIG. 6 is a schematic block diagram of a further embodiment of a concentrated control system for an automotive vehicle according to the invention.

FIG. 6 shows one embodiment of the present invention, in which the output signal of each of the local control channel 3-n is used as the teaching signal Yt for environment index in the embodiment of FIG. 5. When an engine load is to be predicted, by using a basic fuel injection amount Tp representative of the engine load among various signals for controlling engine, the neural network for performing prediction of the engine load can be established and thus enables to predict the engine load in real time.

It should be noted that, in the embodiment to perform prediction in real time, amount of calculation including adding integration of calculated amount and exponential function becomes large, dedicated arithmetic chip for neuron or digital signal processor may be employed. Application of other means for high speed arithmetic operation is also effective.

Figure 7:
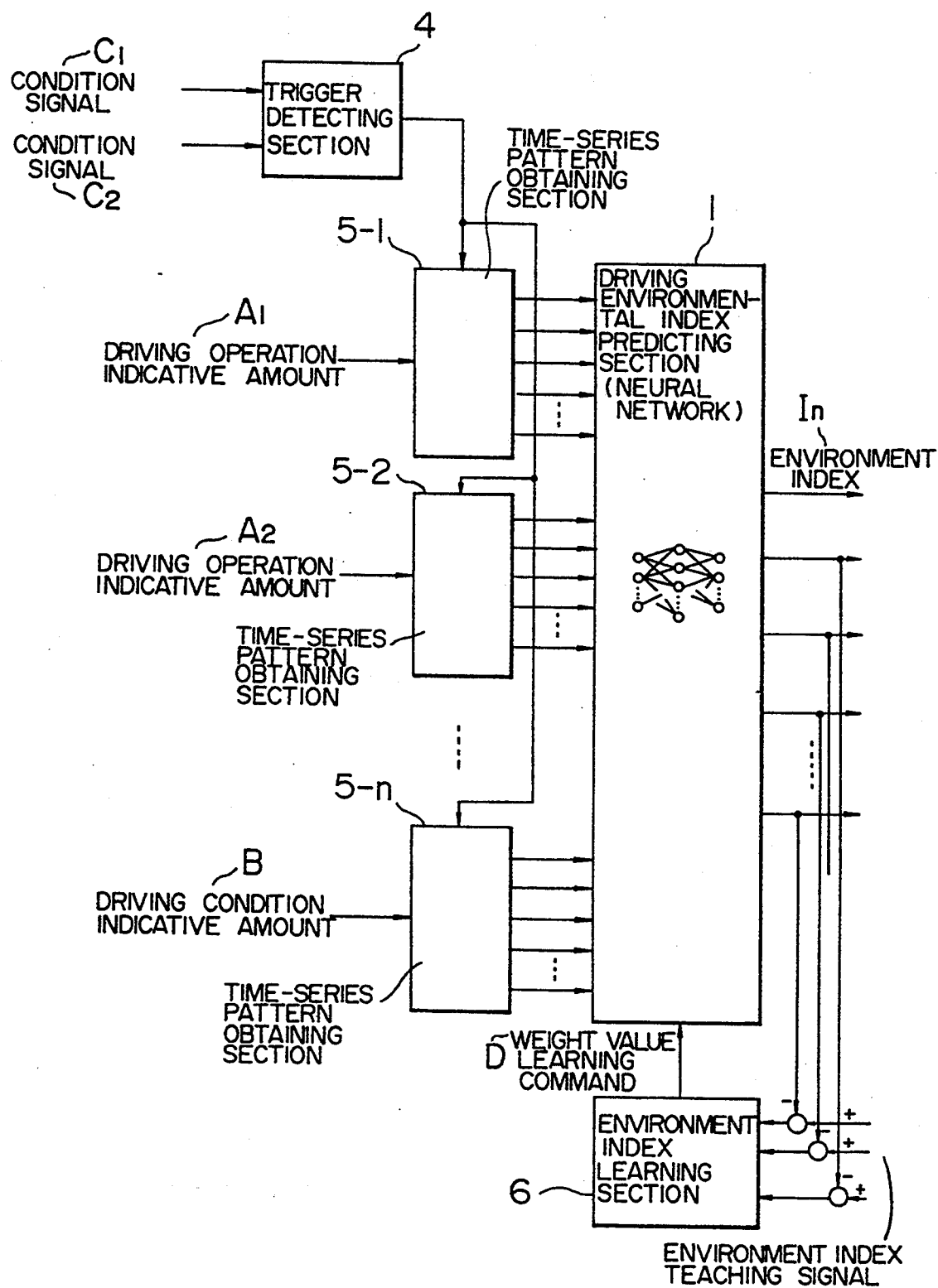
FIG. 7 is a block diagram showing signal input system for a driving environmental index predicting section in one embodiment of the invention.

FIG. 7 shown one embodiment of the present invention, in which the environment index learning section 6 is added for the embodiment of FIG. 2. In this case, the teaching signal is in the same form to that in FIG. 6. However, it is possible to modify the environment index learning section 6 in unsupervised learning to perform learning in off-line.

Figure 8:
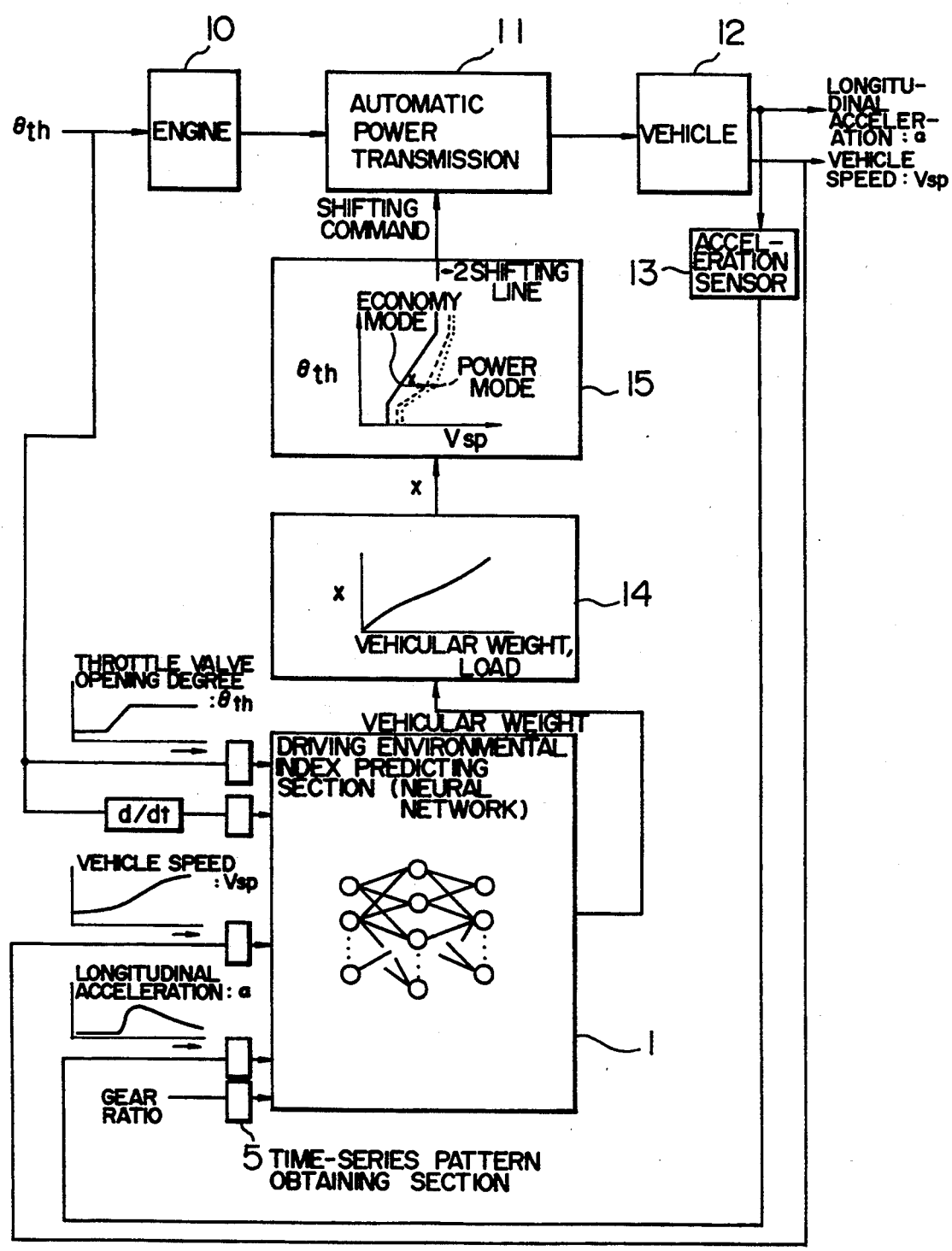
FIG. 8 is a block diagram showing one embodiment of application of the present invention for controlling an automatic power transmission of an automotive vehicle.
Figure 9:
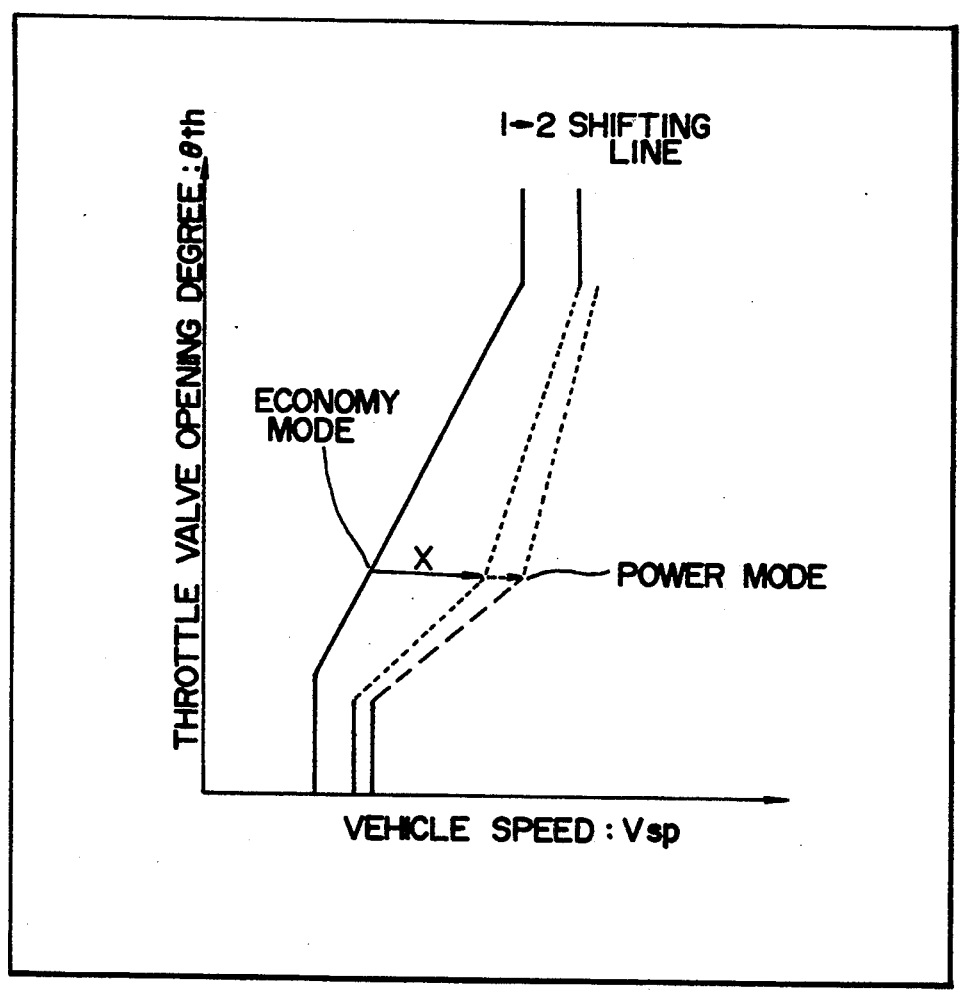
FIG. 9 is a characteristic chart showing shifting characteristics of the automatic power transmission.

FIG. 8 is one embodiment of the invention, in which the present invention is applied for controlling shifting lines of an automatic power transmission. At first, discussion will be given for shifting line control for the automatic power transmission with reference to the characteristic chart of FIG. 9. In FIG. 9, there is illustrated 1-2 shifting lines for shifting-up from the first speed ratio to the second ratio. The solid line at the left side represents shifting line in an economy mode. It should be noted that the shown chart is illustrated in terms of the vehicle speed Vsp in the horizontal line and a throttle valve open angle $\theta$th in the vertical line.

When the vehicle speed is increased during acceleration at a constant throttle valve open angle, acting point shifts from the left side of the 1-2 shifting line to the right side thereof to cause shifting to the second speed ratio. In case that the economy mode is selected, the shifting line is positioned left side relative to that of the power mode. Therefore, shift-up is caused at lower vehicular speed to improve total fuel economy.

In the prior art, only two choices of economy and power modes are presented. In contrast to this, the shown embodiment can smoothly and sequentially vary the shifting characteristics between these two modes of shifting lines. The non-linearity of the shifting line is caused due to specific characteristics of the engine and the power transmission and thus variable depending upon the specific engine and the transmission for which the present invention is applied.

With respect to the economy mode characteristic line set for better fuel economy, by increasing the parameter X, the shifting characteristics of the transmission shifts to the power mode characteristic line. By this, lower speed ratio is used more frequently used so that greater driving torque can be transmitted to the wheels at the range, in which the lower speed ratio can be used. Therefore, according to increasing the vehicular weight, the parameter X is increased to widen the range to use the lower speed ratio for improving torque characteristics during acceleration.

Figure 10:
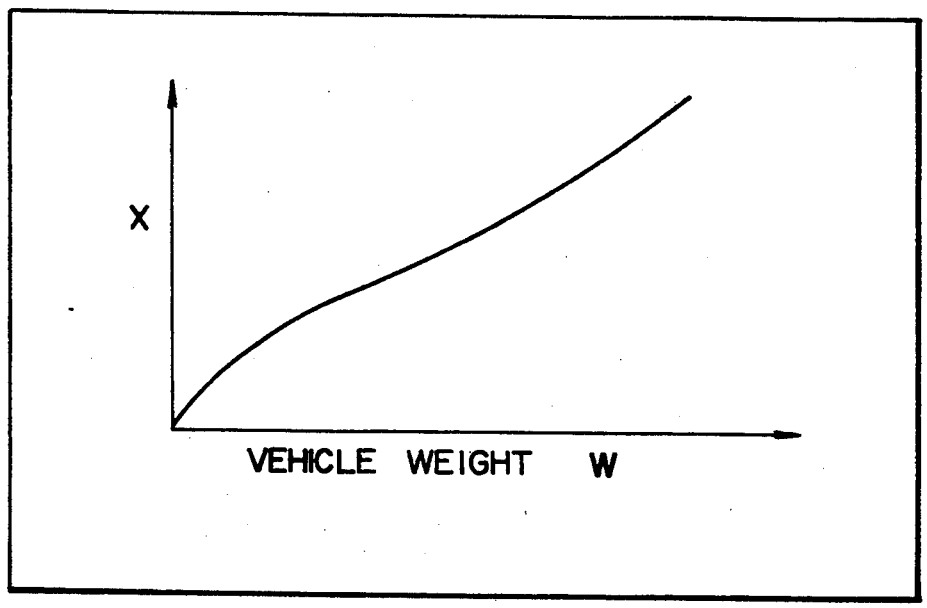
FIG. 10 is an explanatory chart showing relationship between a parameter employed in one embodiment of the invention and a vehicular weight.

FIG. 10 shows a relationship between a vehicular weight W and a parameter X. As can be seen, the relationship is monotone increasing function. Accordingly, when the vehicular weight W is large, the parameter X becomes great value. As a result, the shifting line of FIG. 9 becomes closer to that in the power mode.

Returning to FIG. 8, the rotational torque of the engine 10 is transmitted to the vehicle 12 through the automatic power transmission 11. A resultant acceleration on the vehicle 12 is detected by an acceleration sensor 13 to input the detected acceleration to the driving environmental index predicting section 1. The driving environmental index predicting section 1 receives signals representing a throttle valve open angle (opening degree) $\theta$th, the vehicle speed Vsp and a longitudinal acceleration $\alpha$ of the vehicle from respective sensors to predict (estimate) the vehicular (vehicle) weight. A driving environmental index converting section 14 converts an index X. A shifting command converting section 15 outputs a shifting command to the automatic power transmission 11.

Figure 11:
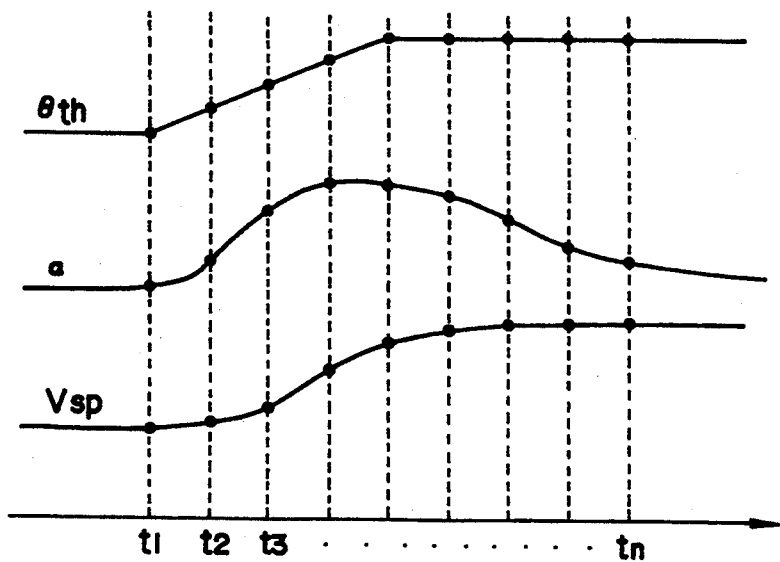
FIG. 11 is a timing chart showing process of establishing time-series patterns of input signals in one embodiment of the invention.

FIG. 11 shows timings for reading out signals by the time-series pattern obtaining section 5. As can be seen, the shown embodiment is designed to periodically sample the signals with a given constant intervals. Respective signals are started to be input by the trigger detecting section 4 when the differentiated value of the throttle valve open angle $\theta$th exceeds a predetermined value.

FIGS. 12A to 12D show practical waveforms of the acceleration response. As can be clear from FIGS. 12A to 12D, even at the same vehicular weight, the acceleration response varies. Namely, according to increasing the throttle valve open angle, the peak value of the acceleration is increased. Furthermore, according to increasing of the vehicular weight, the peak value of the acceleration is reduced.

Figure 12:
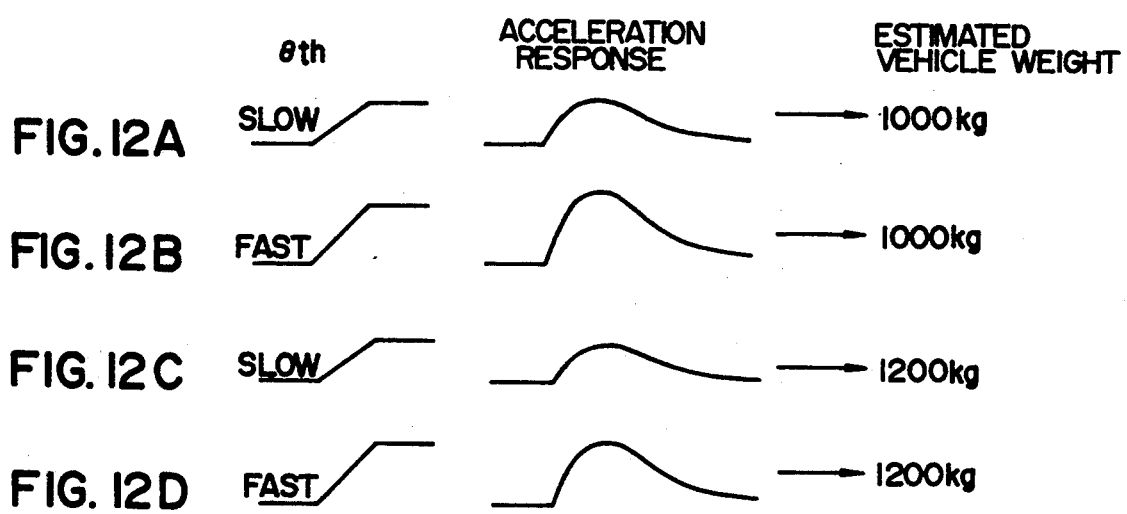
FIGS. 12A to 12D are characteristic charts showing relationship between acceleration response and vehicular weight in one embodiment of the invention.

Here, FIGS. 12A and 12C represent the acceleration characteristics at the same throttle valve open angle. At this time, since the driving load are equal to each other, the vehicular weight can be predicted. Namely, the prediction of the vehicular weight by the neural network can be performed by performing pattern recognition of the waveforms of acceleration response of FIGS. 12A and 12C. The acceleration response to FIGS. 12B and 12D can also be recognized in the similar manner. In other words, with the patterns at the same throttle valve open angle, the vehicular weight can be predicted (estimated) by the peak values of the acceleration response patterns.

As can be easily appreciated from the foregoing discussion, instead of establishing the time-series patterns, preliminary treatment, such as detection of the throttle valve open angle variation pattern or detection of the peak valve of the acceleration, can be applied for performing prediction of the vehicular weight.

The feature of the neural network is the capability of learning of functional characteristics even in various non-linear characteristics.

Figure 13:
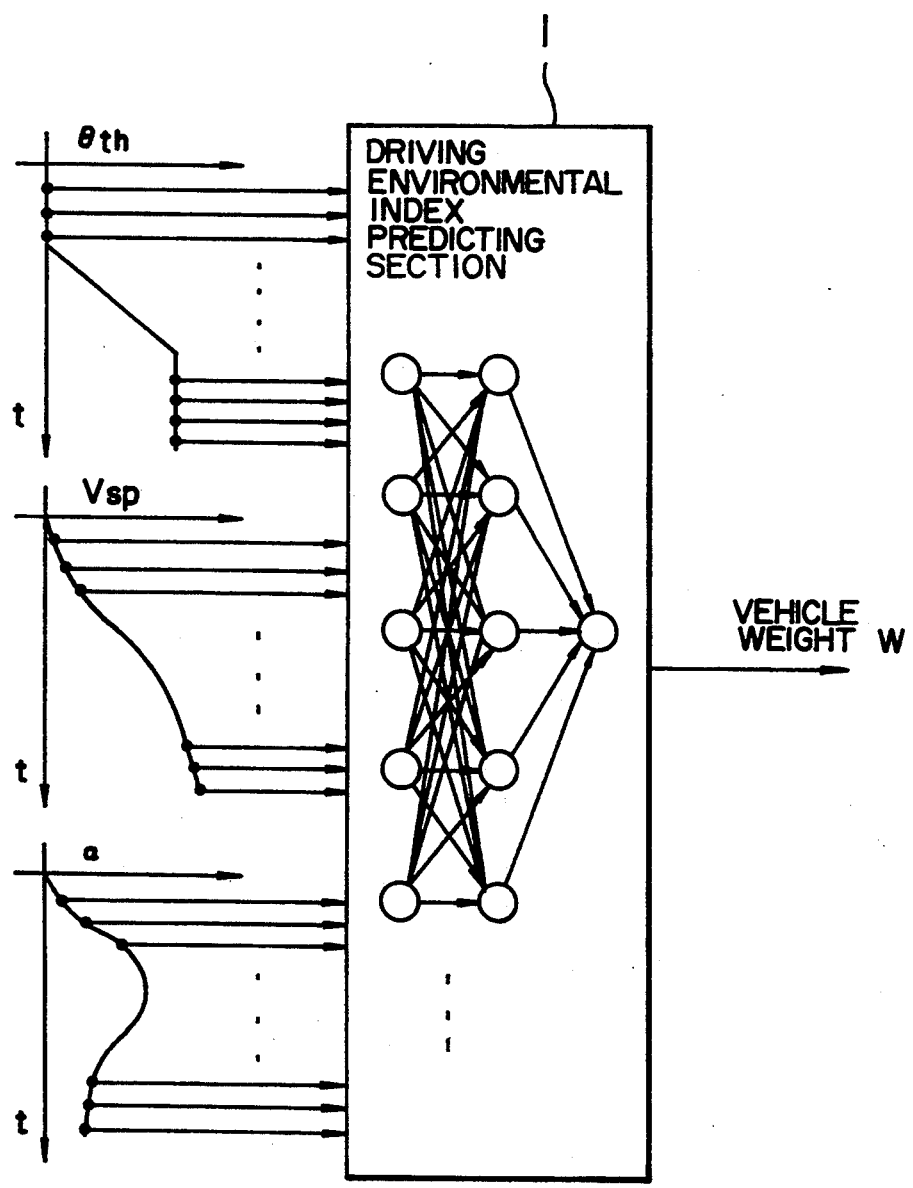
FIG. 13 is an explanatory illustration showing a condition, in which time-series patterns of a throttle open angle, a vehicle speed and an acceleration are input to the driving environmental index predicting section comprising a neural network.

This feature will be discussed with reference to FIG. 13. In this figure, a condition, in which the time-series patterns of the throttle open angle, the vehicle speed and the acceleration are input to the neural network. In the shown example, the predicted vehicular weight W is output from single channel output as an analog value. However, it is possible to divide the vehicular weight for five ranges and set flags when the vehicular weight is held within the associated weight ranges. The reason whey the vehicle speed Vsp is input, is due to necessity therefor as a parameter defining the acceleration response.

With the foregoing discussion, one embodiment of vehicular weight prediction according to the present invention has been discussed. Further detail of prediction of the vehicular weight will be provided in the following disclosure in more practical manner.

Figure 14A:
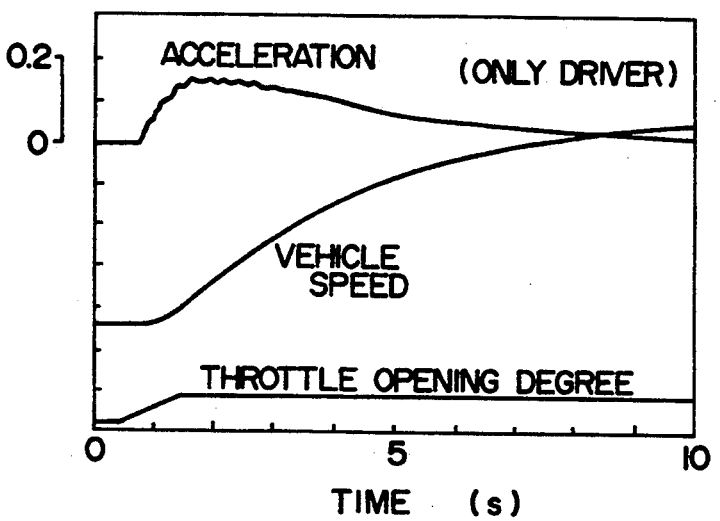
FIGS. 14A to 14B are characteristic charts showing acceleration response patterns of the acceleration and the vehicle speed upon depression of an accelerator corresponding to increasing of boarding passengers.
Figure 14B:
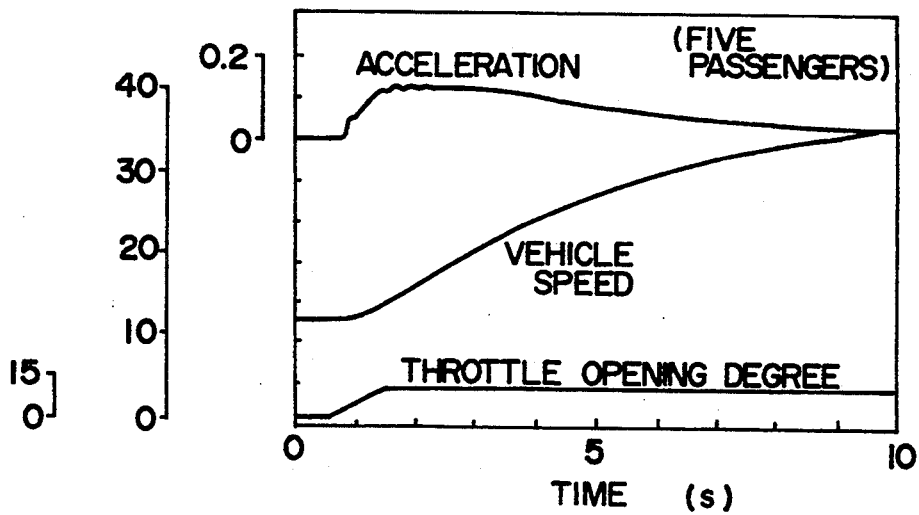

FIGS. 14A and 14B show waveforms of acceleration response in the vehicular acceleration and the vehicular speed upon increasing of accelerator depression magnitude. As can be seen, according to increasing of the boarding passengers, both of the vehicular acceleration and the vehicular speed become smaller. The neural network learns such acceleration responses.

Figure 15:
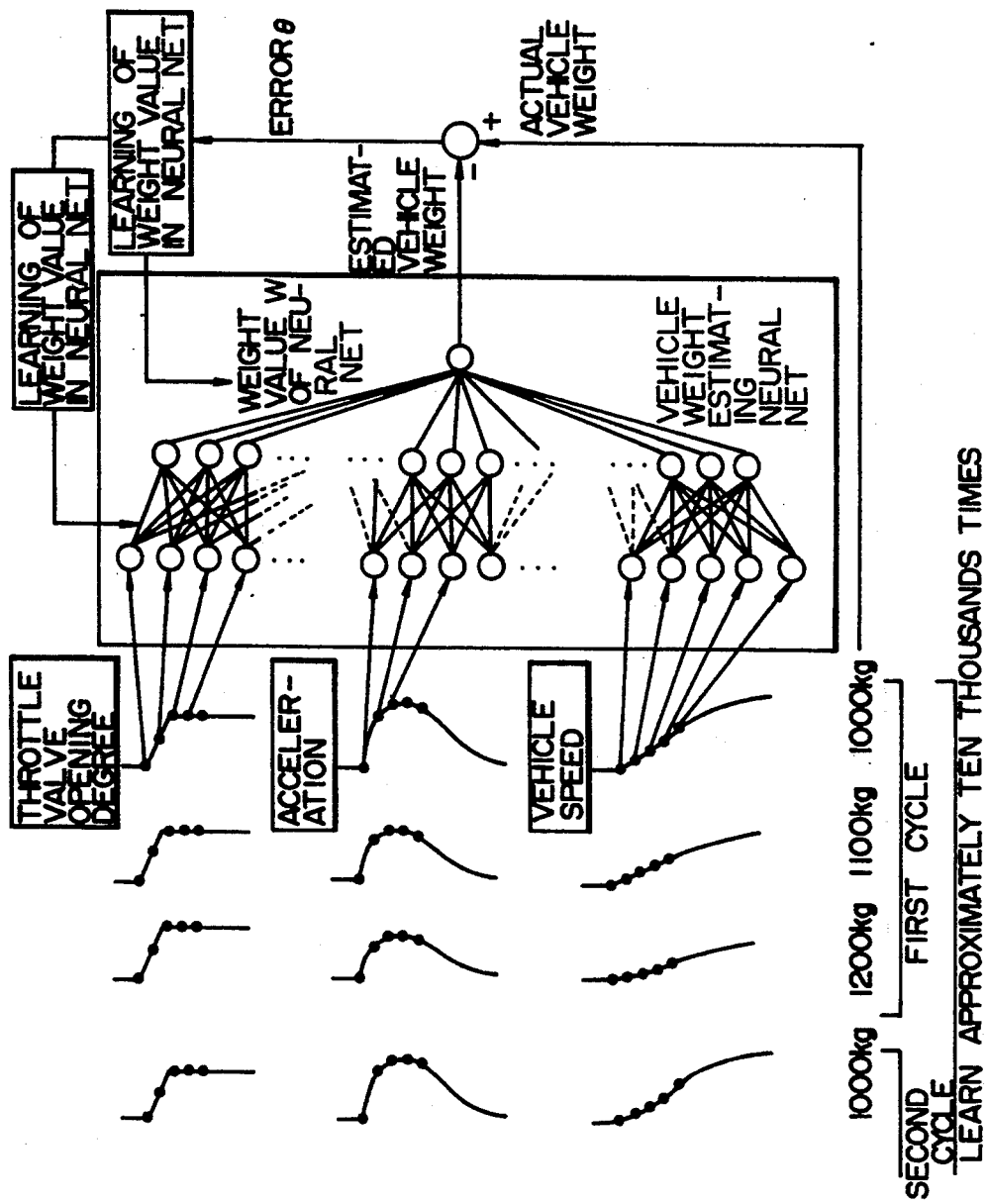
FIG. 15 is an explanatory illustration showing process of learning of acceleration response patterns corresponding to the vehicular weight in the neural network in one embodiment of the invention.

FIG. 15 shows the process of learning of the waveform of the acceleration response corresponding to the vehicular weight, in the neural network. At first, the throttle valve open angle, the acceleration and the vehicle speed corresponding to the vehicular weight 1000 kg are divided into to form discrete finite data. The finite data thus generated are input to the neural network. The input values as the finite data are multiplied with weighting values of synapses from the intermediate stage to the output stage to formulate the output with the products.

Accordingly, with the embodiment set forth above, prediction of the vehicular weight can be enabled. Even when the vehicular weight and the acceleration are correlated with non-linear characteristics, such non-linear characteristics can be properly learnt by the neural network to facilitate establishing of the total control system for the automotive vehicle.

Here, so as to reduce a difference of the vehicular weight to be predicted and an actual vehicular weight to be supervised, the weights at the synapses in the neural network are modified. This process is called as learning.

Newt, with respect to two types of waveforms at the vehicular weights 1100 kg and 1200 kg, learning is performed in the same manner. For completing learning, these three patterns has to be repeatedly learned. Number of learning cycles may extends normally several thousands times to several tens thousands.

Figure 16:
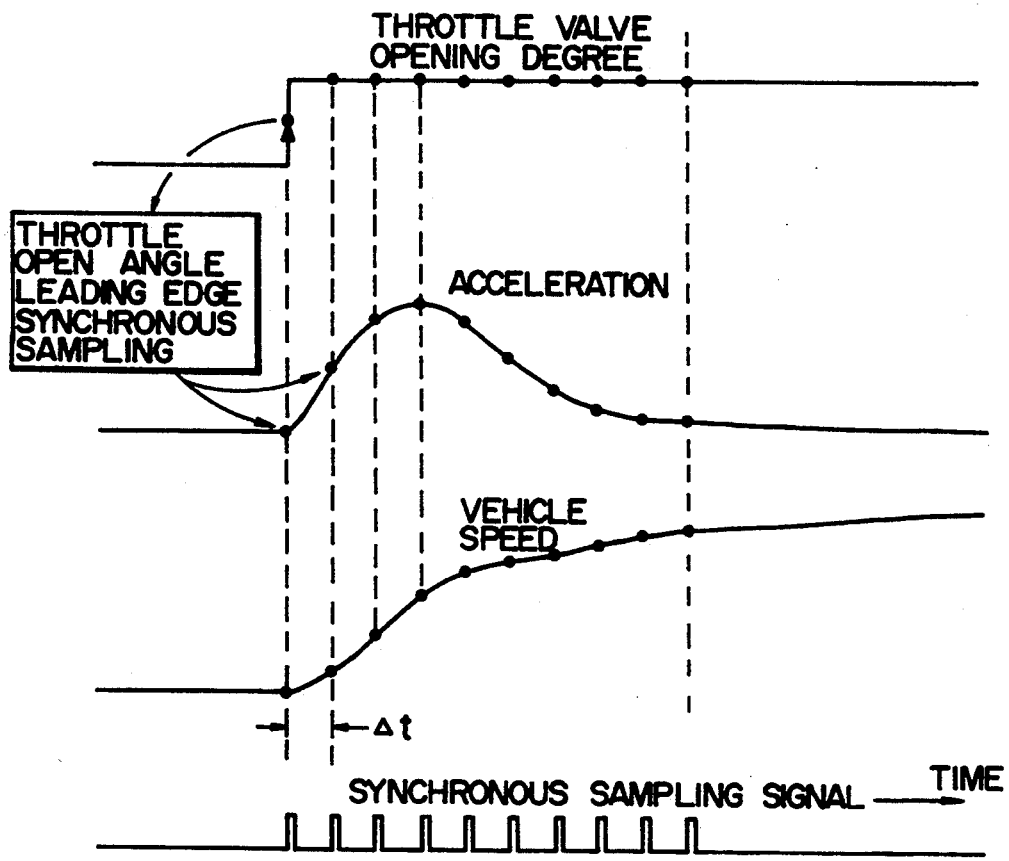
FIG. 16 is an explanatory timing chart showing reading out timing of input signals in one embodiment of the invention.

Reading out of respective wave forms is performed in synchronism with leading edge of the signal indicative of the throttle valve open angle, as shown in FIG. 16. Three types of waveforms are periodically sampled with a given constant interval. In FIG. 16, the lowermost waveform represents a synchronous sampling signal so that respective signals are sampled at the timings defined by this synchronous sampling signal.

Figure 17:
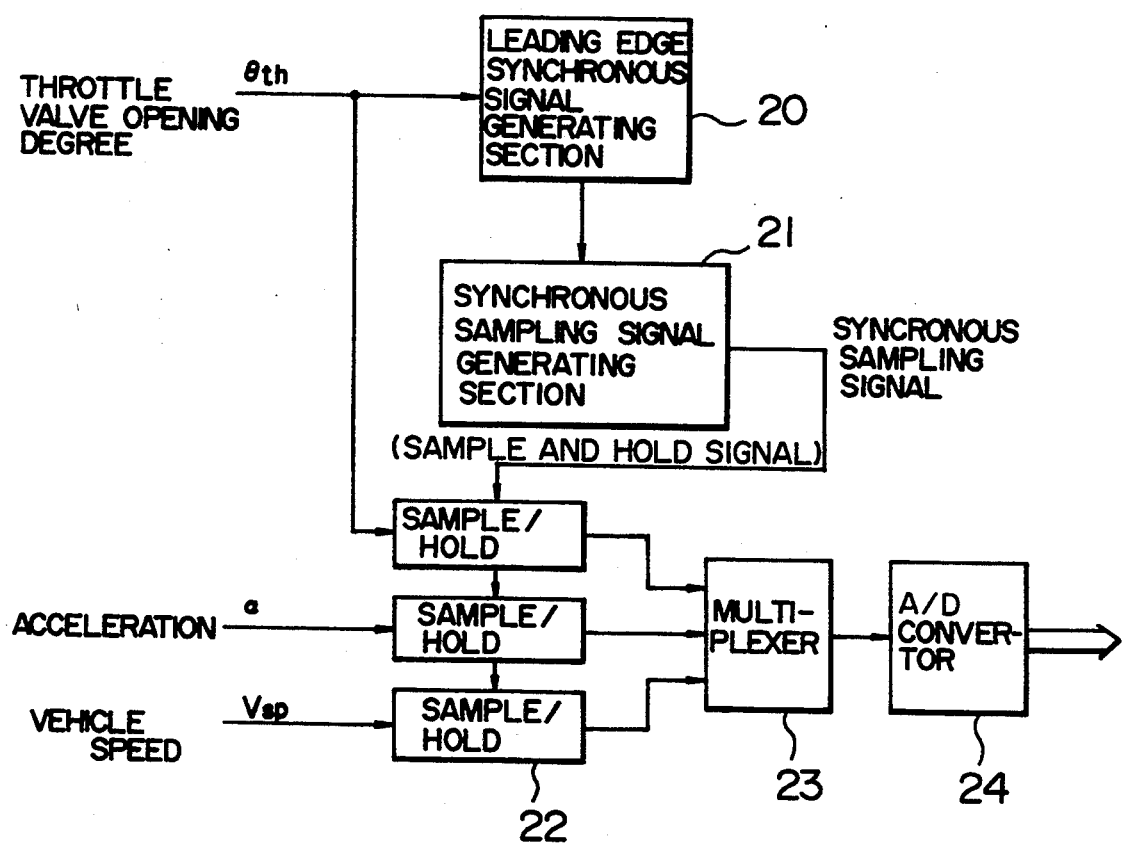
FIG. 17 is a block diagram showing one embodiment of a circuit performing synchronous sampling in the present invention.

FIG. 17 shows one example of a circuit which is adapted to implement synchronous sampling. The circuit includes a leading edge synchronous signal generator section 20 which detects the leading edge of the signal representative of the throttle valve open angle to produce a leading edge synchronous signal. A synchronous sampling signal generator section 21 generates synchronous sampling signal in synchronism with the leading edge synchronous signal, at a given constant interval. A sample/hold circuit 22 is responsive to the synchronous sampling signal to perform sampling and holding operation. The circuit also includes a multiplexer 23 and an analog-to-digital (AD) converter 24. The circuit in FIG. 17 with the construction as set forth above, is designed to generate three types of waveforms of the synchronous sampling signals.

It should be noted that although FIG. 17 illustrates the embodiment of the circuit in hardware construction, it is possible to realize the same function by controlling a timer and an analog input channel in a single chip microcomputer by a software. In such case, the timing for synchronization may be selected so that error can be ignored. By this, completely synchronous sampling can be established utilizing the function in the microcomputer.

Figure 18A:
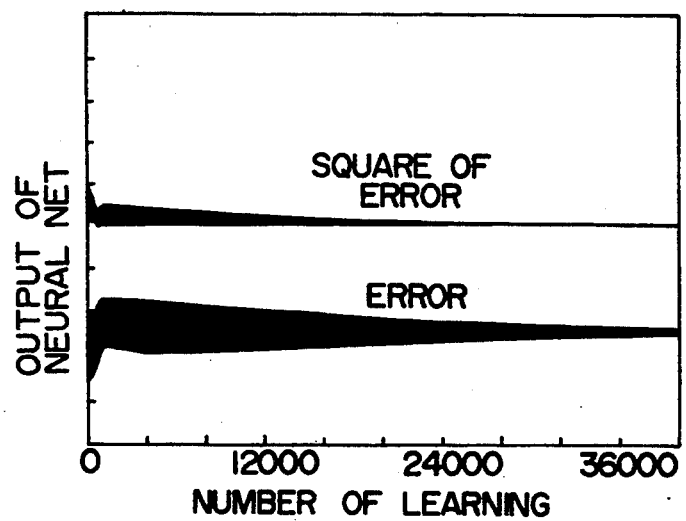
FIG. 18 is an explanatory charts showing results of learning process in one embodiment of the invention.
Figure 18B:
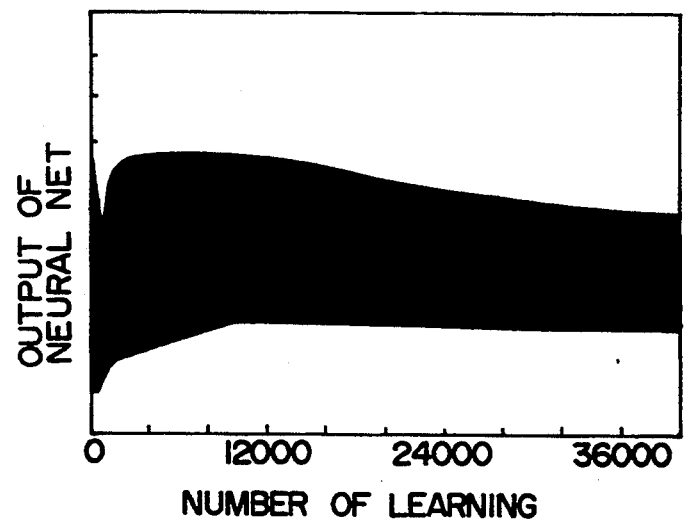

FIGS. 18A and 18B show examples as a result of learning in the construction of FIG. 15. The shown example demonstrates that error becomes sufficiently small after learning for approximately forty thousands of learning cycles and that once learning for weighting of the synapses is completed, the result becomes useful in practical application.

Figure 19:
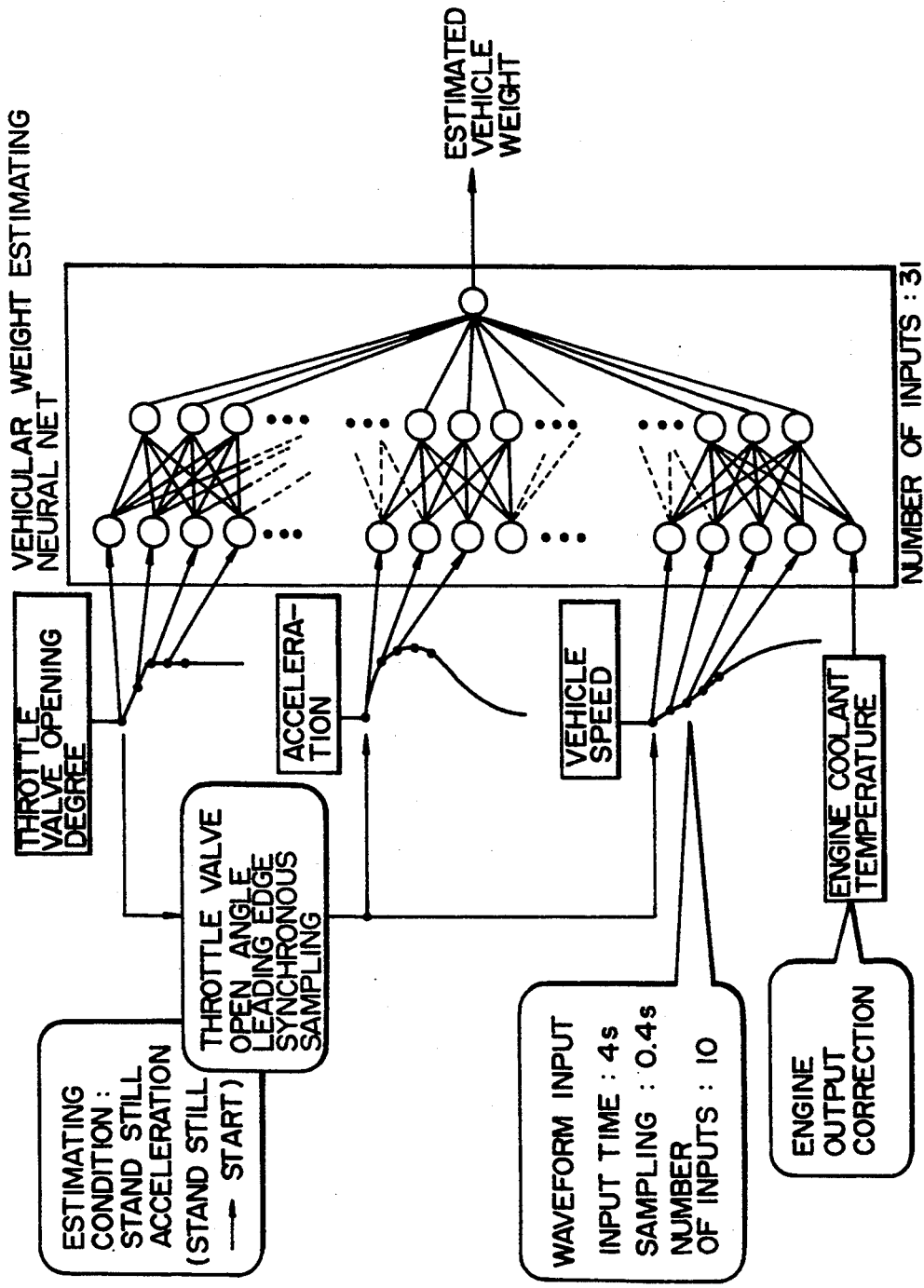
FIG. 19 is an explanatory illustration showing practical construction for performing vehicular weight predicting process in one embodiment of the invention.

FIG. 19 shows practical construction for process in prediction of the vehicular weight in one embodiment of the invention. The shown embodiment features in that the predicting condition is set at the stand still acceleration upon starting up of the vehicle from the stand still condition, at which the high sensitivity for acceleration response can be exhibited. In this case, the gear position is naturally the first speed ratio. Additional feature of the shown embodiment is addition of an engine coolant temperature as inputs for the neuron (neural network) since correction for the engine output becomes necessary at cold engine condition. By this, correction for the temperature characteristics at the stand still acceleration under cold condition of the engine and the automatic power transmission under becomes possible.

Figure 20:
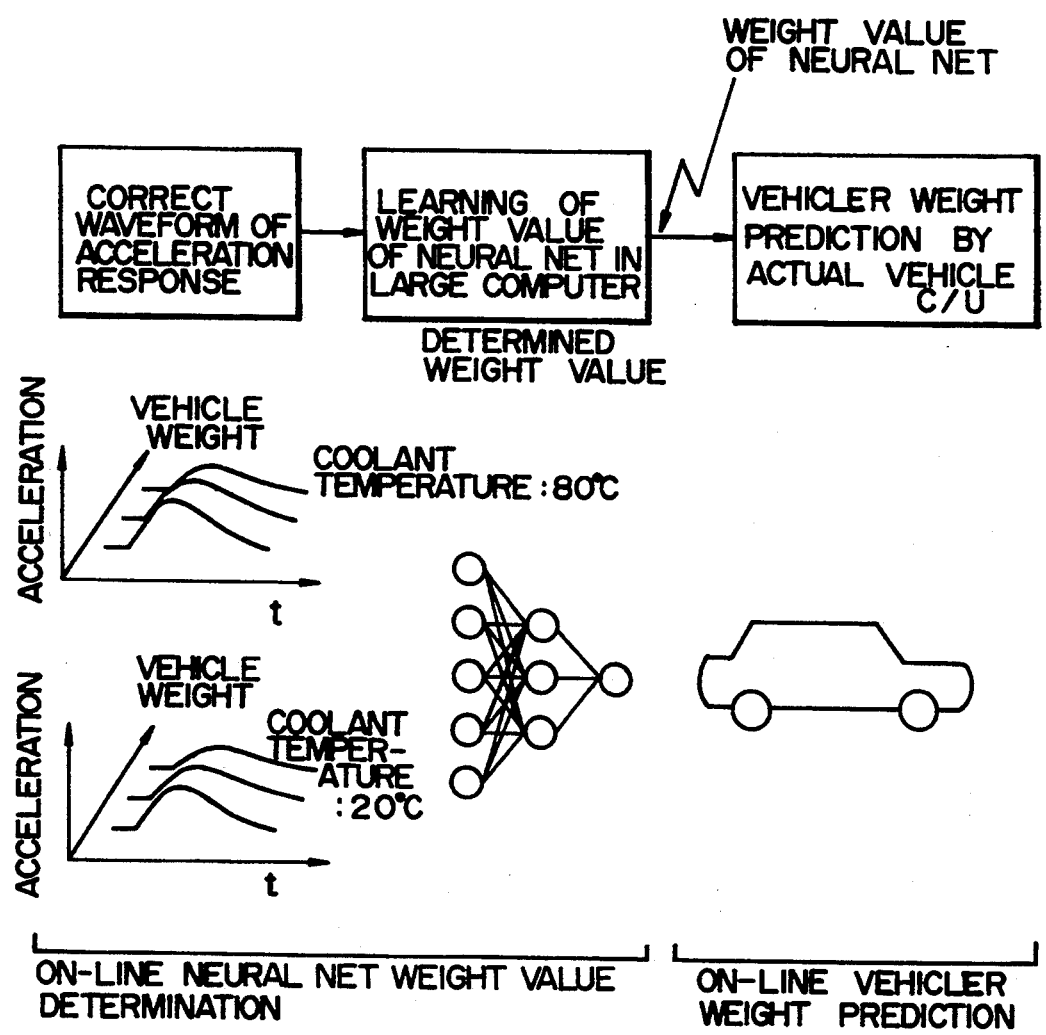
FIG. 20 is an explanatory illustration showing process for realizing neuron predicting process for installation in the automotive vehicle, in one embodiment of the invention.

FIG. 20 shows one embodiment of a process for realizing prediction by neuron adapted for installing on the vehicle. In this embodiment, learning for weighting in the neuron for predicting the vehicular weight is performed in off-line and the weight values of synapses for the neuron are stored in ROM to be handled within the microcomputer. Accordingly, the shown embodiment is not allow on-line learning for the weight values of the synapses. However, by employing well learnt neuron, on-line prediction of the vehicular weight becomes possible. In the future, when on-line learning process becomes available by neuron chips or OSP, it may be possible to perform on-line correction of the weighting value.

Figure 21:
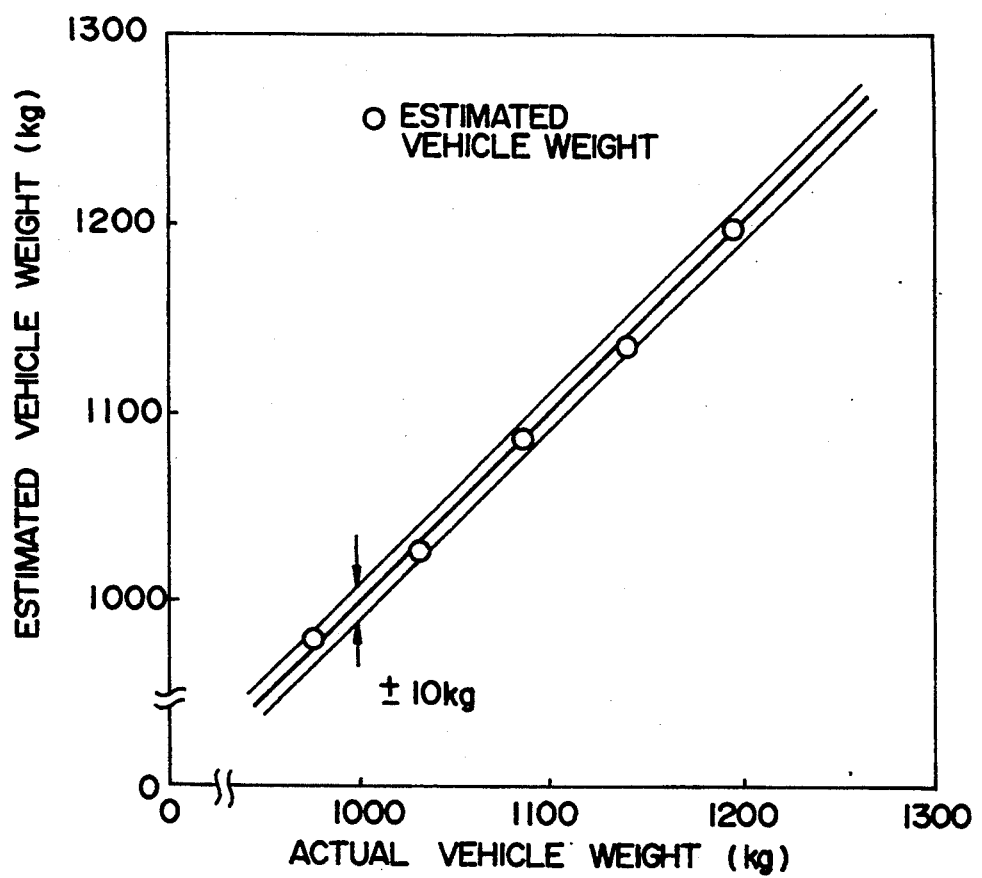
FIG. 21 is an explanatory illustration showing the results of learning and prediction in one embodiment of the invention.

FIG. 21 shows the results of prediction of the vehicular weight with the neuron of FIG. 19 after learning of the vehicular weight. As can be seen, with the embodiment of FIG. 19, high accuracy resolution of 10 kg can be achieved. This is because that high accuracy learning is performed by inputting the acceleration, the vehicular speed and the throttle valve open angle, with no sampling phase difference.

Figure 22:
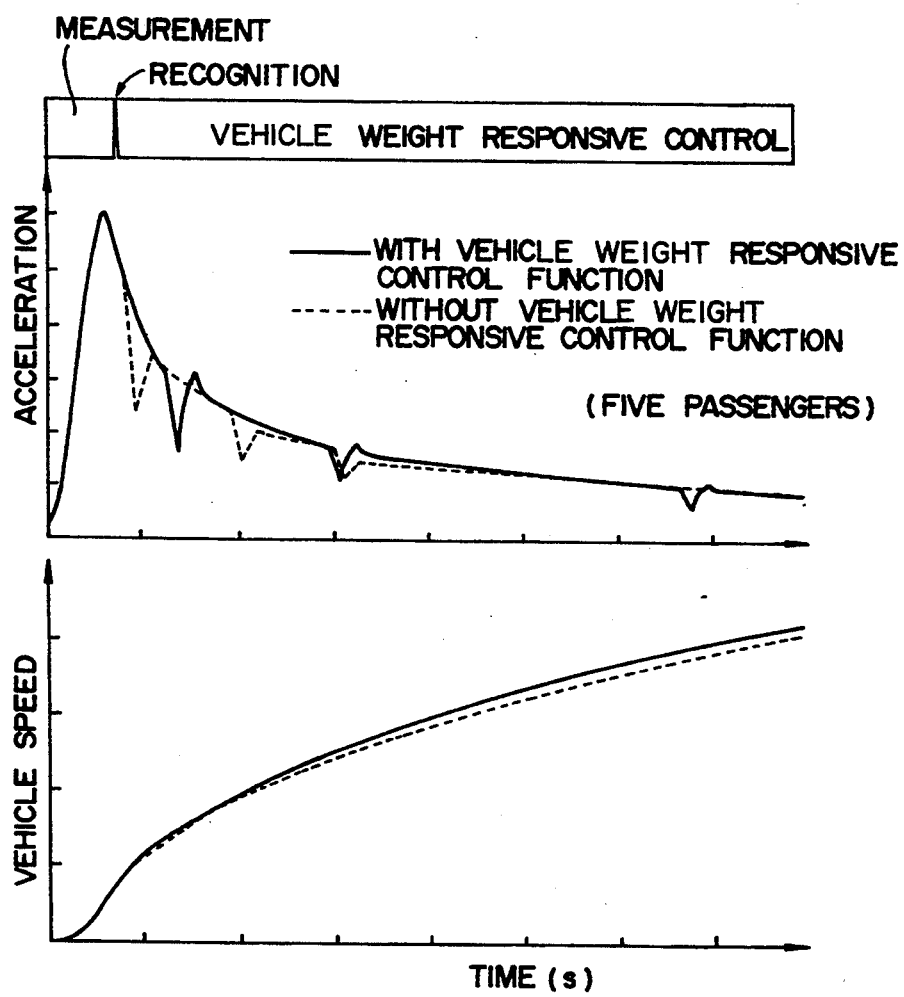
FIGS. 22A to 22B are characteristic charts showing one example of variation characteristics of the acceleration and the vehicular speed at stand still acceleration in a condition of five passenger being boarding.

On the other hand, FIGS. 22A and 22B show variation characteristics of the acceleration and the vehicular speed at the stand still acceleration (at the acceleration in the starting state) with loading five passengers. By detecting the vehicular weight and modifying the shifting characteristics adapted to the vehicular weight as shown by the solid line, the shifting-up timing is delayed to use the first speed ratio for a longer period in comparison with that without adaption of the shifting pattern to the vehicular weight as illustrated by the broken line. As can be clear from FIGS. 22A and 22B, better acceleration characteristics can thus obtained by modifying the shifting characteristics adapting to the vehicular weight.

Accordingly, with the shown embodiment, shifting lines for the automatic power transmission can be set adapted to the vehicular weight for optimizing the vehicular drivability and fuel economy corresponding to the vehicular weight.

Figure 23:
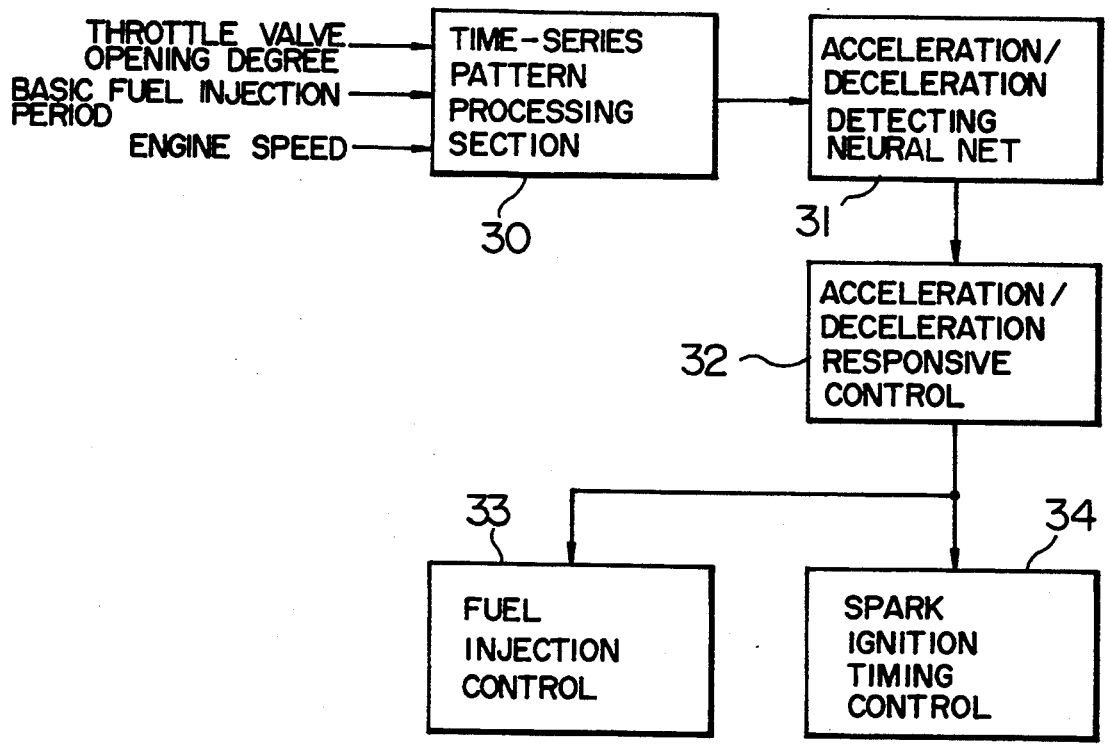
FIG. 23 is a block diagram of one embodiment, in which the present invention is applied for acceleration and deceleration dependent correction of a fuel injection amount for an engine.

FIG. 23 shows another embodiment of the invention, in which the present invention is applied for correction of a fuel injection amount for the engine during acceleration and deceleration of the vehicle. In the shown embodiment, various signals, e.g. the throttle valve open angle θth, the basic fuel injection amount or period Tp and the engine speed, received through the time-series pattern processing section 30 are processed by an acceleration and deceleration detecting neuron 31 for predicting acceleration or deceleration magnitude. The predicted acceleration or deceleration magnitude is output as the driving environment index in a form of an analog signal. Based on the driving environment index thus derived, acceleration/deceleration responsive control is performed to perform a fuel injection control 23 and a spark ignition control 24 for the engine for controlling fuel injection and spark ignition during acceleration or deceleration period.

Figure 27:
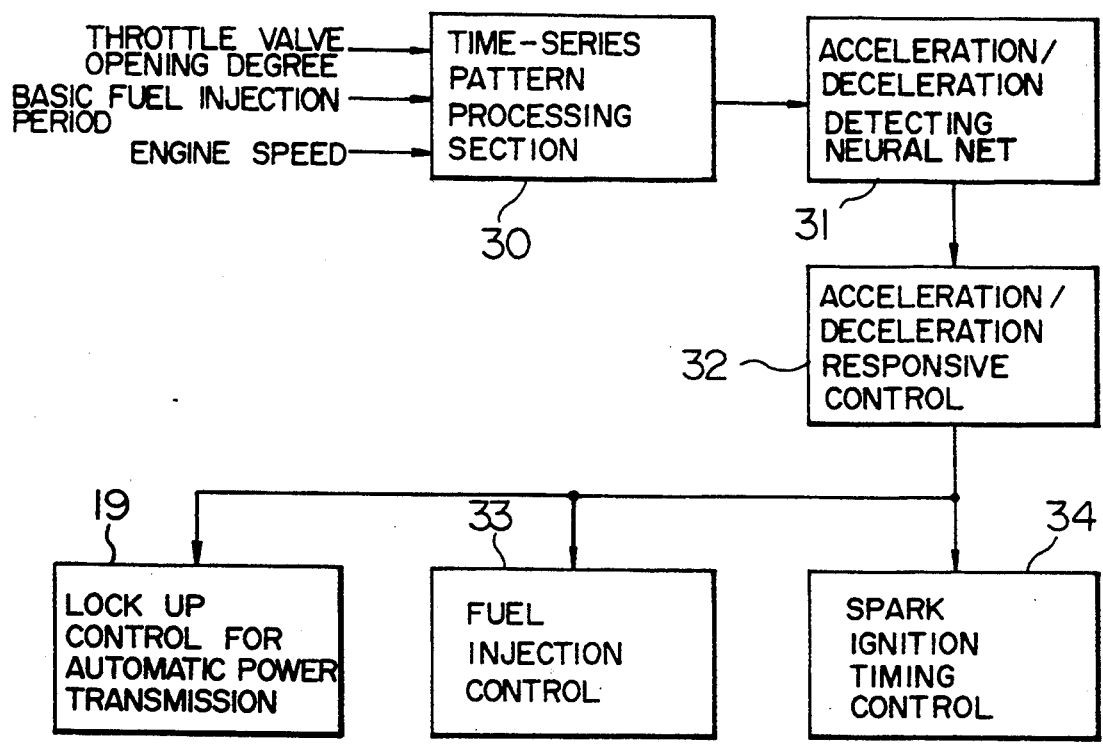
FIG. 27 is a block diagram of one embodiment of the invention, in which the present invention is applied for combined control for the engine operation and the automatic power transmission.

FIG. 27 is a modification of the embodiment of FIG. 23, which is applied for correction of fuel injection amount for the engine during acceleration and deceleration and lock-up control for the automatic power transmission. In this embodiment, the lock-up of the automatic transmission is taken place during deceleration state for making the fuel cut function in the fuel injection control during deceleration, more effective. On the other hand, during acceleration, the lock-up of the automatic transmission is released. As can be appreciated, in this embodiment, both of the engine and the automatic transmission are controlled during acceleration and deceleration.

Accordingly, with the shown embodiment, since the magnitude of acceleration or deceleration can be precisely predicted to reflect on fuel injection control and spark ignition control for optimizing the engine operation in view of the engine performance and fuel economy. In addition, according to the present invention, emission control and fuel cut-off during deceleration can be properly performed for enhancing fuel economy.

Figure 24:
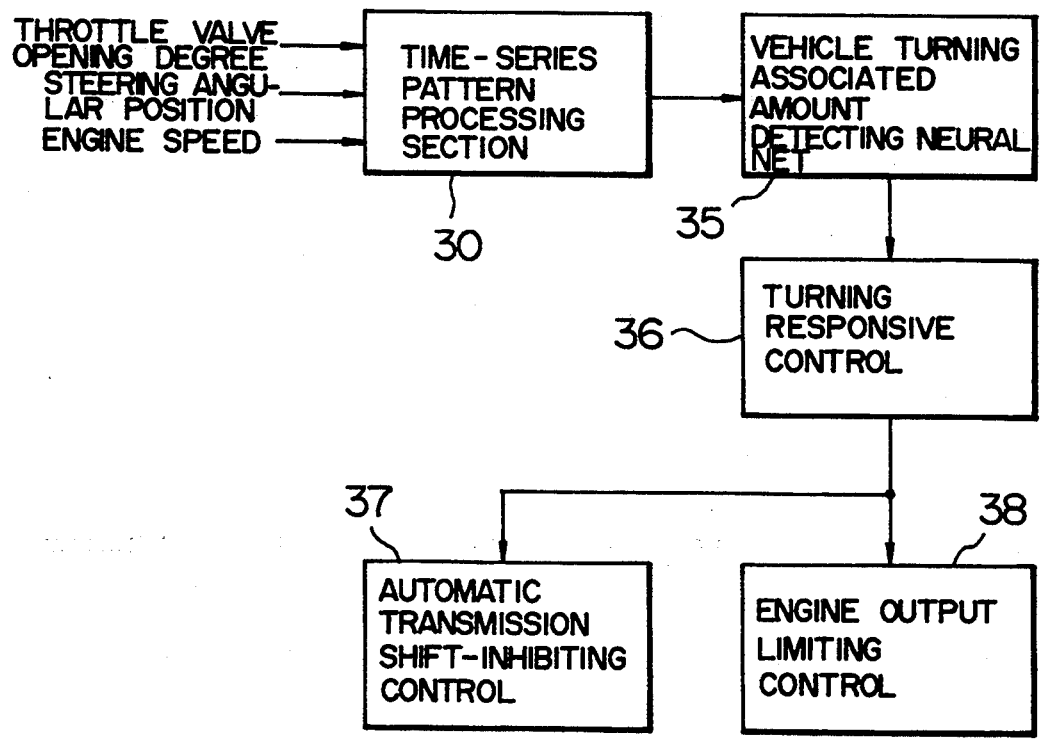
FIG. 24 is a block diagram showing one embodiment, in which the present invention is applied for control upon vehicular cornering.

FIG. 24 shows a further embodiment of the present invention, in which the environment index representative of turning condition of the vehicle is generated. Various input signals, e.g. the throttle valve open angle θth, the steering angular position and the engine speed, are received by the time-series pattern processing section 30. The received signals are processed in a vehicular turn associated amount detecting neuron 35 so that a vehicular turn associated amount can be predicted. The predicted vehicular turn associated amount is output as the environment index. In response to the environment index thus derived, turning responsive control 36 is performed. By the turning responsive control, an automatic transmission shift-inhibiting control 27 and an engine output limiting control 28 are performed for inhibiting shifting operation of the automatic power transmission and for limiting the engine output torque for maintaining high level stability of the vehicle during cornering.

With this embodiment, shift-inhibiting control for the automatic power transmission for avoiding abrupt change of the driving torque and the engine output limiting control for avoiding lateral slip which results in power over-steering can be achieved.

In the shown embodiment, when the throttle valve open angle, the steering angular displacement and brake pedal depression magnitude are employed as inputs, entry into the corner can be detected for enabling further delicate turning control.

As the vehicular turning associated amount, a yawing rate and/or lateral acceleration can be predicted as analog values. With this, unintended shifting operation of the automatic power transmission can be successfully avoided for providing satisfactory stability for vehicular cornering.

Figure 25:
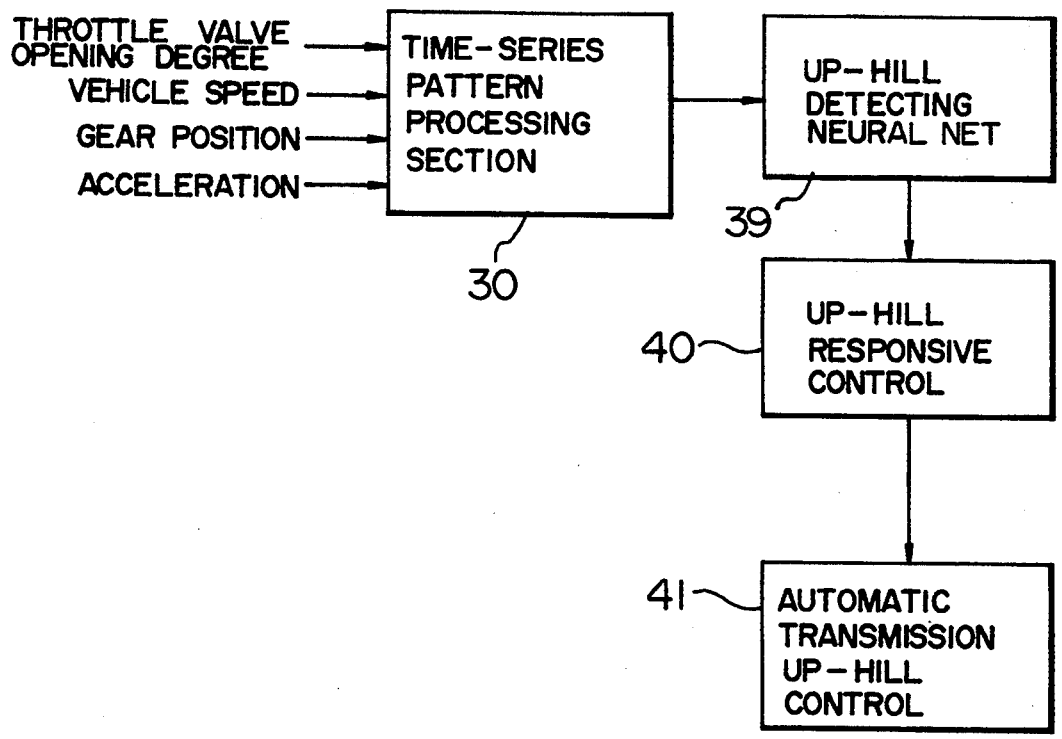
FIG. 25 is a block diagram showing one embodiment, in which the present invention is applied for control upon up-hill driving.

FIG. 25 shows a still further embodiment of the present invention, in which up-hill driving condition is detected to establish the driving environment index representative thereof by the neuron. In the shown embodiment, input signals, such as the throttle valve open angle, the vehicle speed, a transmission gear position and an acceleration, are input to the time-series pattern processing section 30. An up-hill driving detecting neuron 39 processes the throttle valve open and the vehicle speed relative to the gear position to predict the up-hill angle of the road as the environment index.

Based on the predicted up-hill angle, an uphill responsive control 40 is performed for performing up-hill associated automatic transmission control 41 for establishing an up-hill mode shift pattern for maintaining a fixed speed ratio with avoiding hunting in shifting between speed ratios in response to substantially small variation of the accelerator pedal depression magnitude.

Accordingly, with the shown embodiment, unintended and repeated shifting-up and -down of the transmission speed ratio can be successfully avoided for provided better drivability and riding comfort for the vehicle. On the other hand, a block in FIG. 28 can be used for predicting the vehicular weight. By incorporating this in the foregoing construction, traveling resistance at up-hill driving can be more accurately detected for allowing more precise control.

Figure 26:
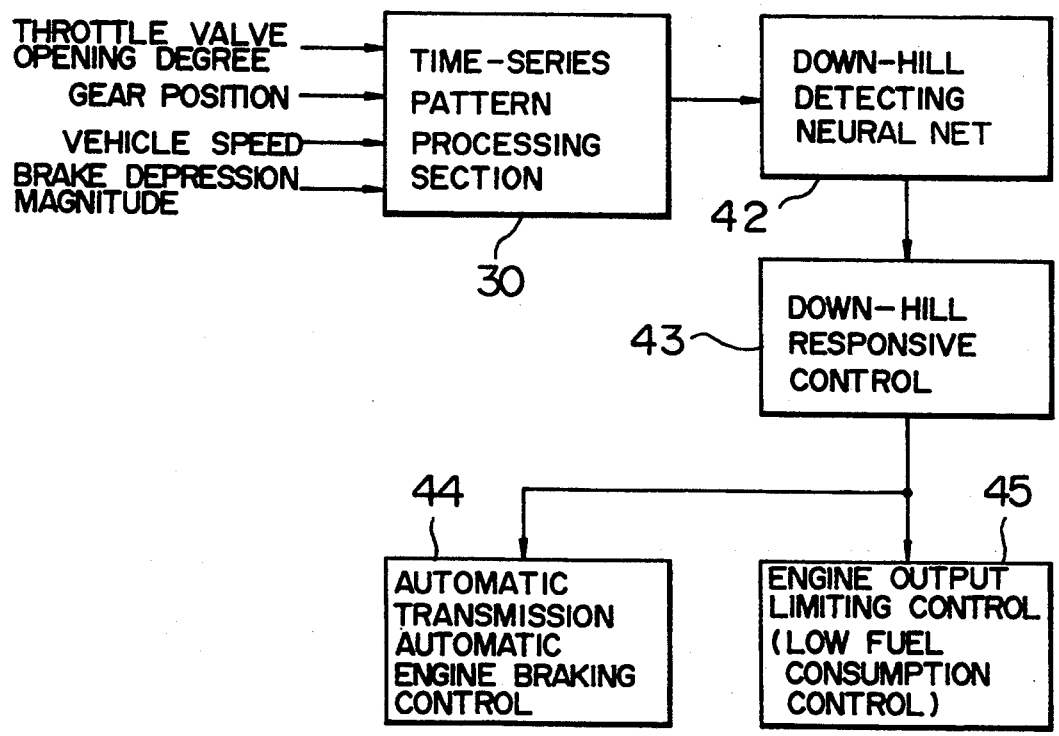
FIG. 26 is a block diagram of one embodiment of the invention, in which the present invention is applied for control upon down-hill driving.

FIG. 26 shows a yet further embodiment of the present invention, in which the down-hill driving condition is detected to establish the environment index based thereon. As input signals, the throttle valve open angle, the transmission gear position, the vehicular speed and the brake depression magnitude are input for the time-series pattern processing section 30. The down-hill driving detecting neuron 42 receives processes the time-series patterns of the throttle valve open angle, the transmission gear position, the vehicle speed and the brake pedal depression magnitude for predicting the down-hill angle of the road to generate the environment index representative thereof.

Based on the down-hill angle indicative environment index, down-hill responsive control 43 is performed and whereby performs an automatic engine braking mode control 44 for the automatic power transmission and the engine output limiting control 45 are performed for automatically effecting engine brake. In the practical control, when the vehicle speed is increased at the throttle valve open angle approximately at fully closed position or idling position, the transmission gear position is shifted at the second speed ratio in response to depression of the brake and hold thereat for effecting engine brake.

It should be noted that it may be beneficial to control the minimize the fuel supply amount for the engine while the engine brake is effected for enhancing fuel economy.

Accordingly, the shown embodiment enables to neglect the second speed range and/or the first speed range from a selector of the automatic power transmission for reducing possibility of erroneous operation. It should be noted the shown embodiment may be combined with the embodiment of FIG. 27, in which the lock-up of the automatic transmission is taken place during deceleration state for making the fuel cut function in the fuel injection control during deceleration, more effective. On the other hand, during acceleration, the lock-up of the automatic transmission is released.

While the foregoing embodiments set forth above employs the environment index for use in the local control channel, in the alternative embodiment of the invention, the environment index is stored in a specific address in a memory to use as a reference data upon occurrence of abnormality of vehicular driving. With this embodiment, on-board diagnostic function can be reinforced. With taking the vehicular weight as an example, the result of prediction of the vehicular weight is determined by the vehicular weight, number of on-boarding passengers and weight the luggage. The foregoing function may be used for detecting excessively large or small weight to make judgement of failure of the processing system, such as failure of the acceleration sensor.

It should be noted that the shown embodiments are designed to control the local control channel directly by the outputs of the neuron, it is further advantageous in view of fail-safe capability, to provide a verify the output of the neuron according to a given logic.

Although the detailed description has been given principally for the automatic transmission control, the invention is also applicable for various engine control. In particular, the present invention is suitable to be applied for learning control of an air/fuel ratio.

As set forth above, when the present invention is applied for engine control, e.g. the fuel supply or injection amount control, the spark ignition timing control for performing control with the driving environment index predicting section of the neural network, delicate engine control precisely adapted the vehicle driving condition can be realized. For instance, when the present invention is used for fuel cut-off control, precise and delicate fuel cut-off condition can be set for optimizing fuel consumption in view of the engine driving efficiency. In such case, the fundamental control architecture of FIG. 1 may be applicable.

In the mean while, the present invention has been discussed in terms of the vehicular driving systems, i.e. the engine and the automatic power transmission, the local control channels as the objects for which the control according to the present invention is to be applied, are not limited to these local control channels but can be applied for various functions of local control channels.

For example, in case of the automotive suspension system, by providing the vehicular vertical acceleration as the environment index for controlling damping characteristics of a shock absorber, vehicular suspension characteristics can be adapted to the environmental condition.

In addition, with employing the automotive suspension control valve and the vehicular turning associated amount in combination as the environment index, optimal vehicular height control and rear wheel steering control in a four wheel steering system (4WS) with variable characteristics can be realized.

On the other hand, when the local control channels is for controlling torque distribution in a four wheel drive vehicle, the driving torque distribution between the from and rear wheel can be maintained optimum by employing the environment index derived from acceleration and deceleration of the vehicle.

Additionally, the shifting control for the automatic power transmission can be correlated with the band brake operation through the driving environment index, reduction for the shifting shock can be achieved. In such case, shifting command is input as the environment index, and the longitudinal acceleration is input to the driving environmental index predicting section, variable control for the band brake in the automatic power transmission becomes possible.

Furthermore, the control employing the environment index according to the present invention significantly contribute for harmonization of distributed controls in respective of the local control channels.

It should be appreciated that, in various embodiments discussed hereabove, the predicting process in the driving environmental index predicting section 1 may be implemented based on the known fuzzy logic. Although the foregoing shows the embodiments, in which the driving environment index predicting section is formed by neuron, the time sequence signal groups can be of different dimensions. From the time sequence data of these signal group, pattern recognition method which find matching pattern in a plurality of preliminarily prepared reference patterns, or prediction according to fuzzy rule can equally applicable for deriving the index.

Figure 28:
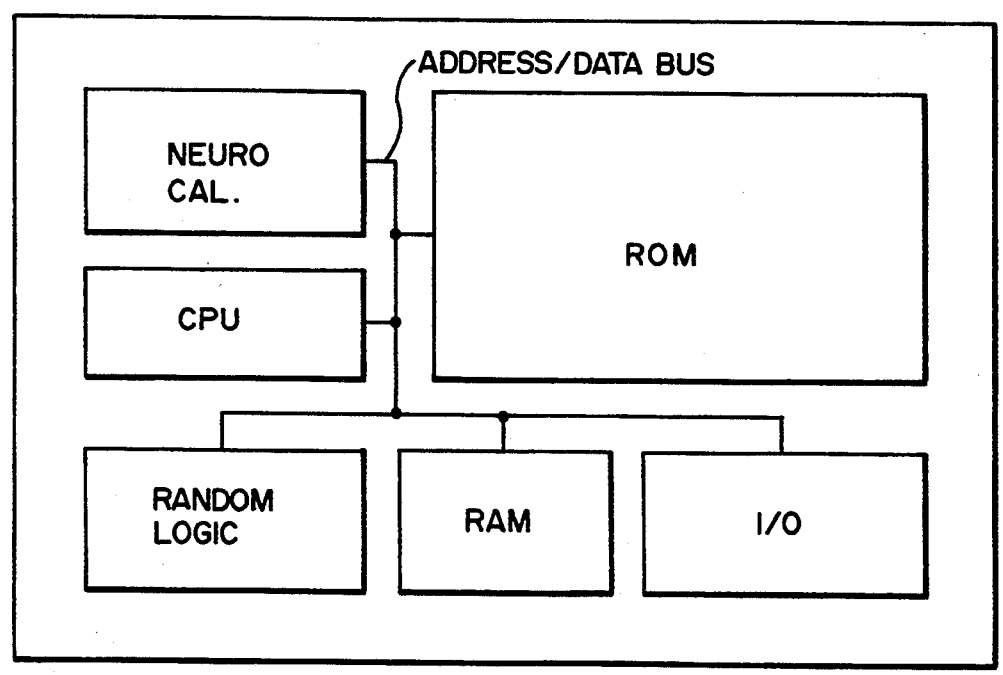
FIGS. 28 to 32 are explanatory illustration showing variation of hardware layouts for implementing the present invention.

FIG. 28 shows hardware construction of the present invention. The neuron operating section forming the driving environment index predicting section is fabricated with CPU, ROM, RAM, I/O, random logic on the common chip. With the shown construction, the power source, grounding, memory can be used commonly, and exchange of signals easier, for establishing the system with higher efficiency.

Figure 29:
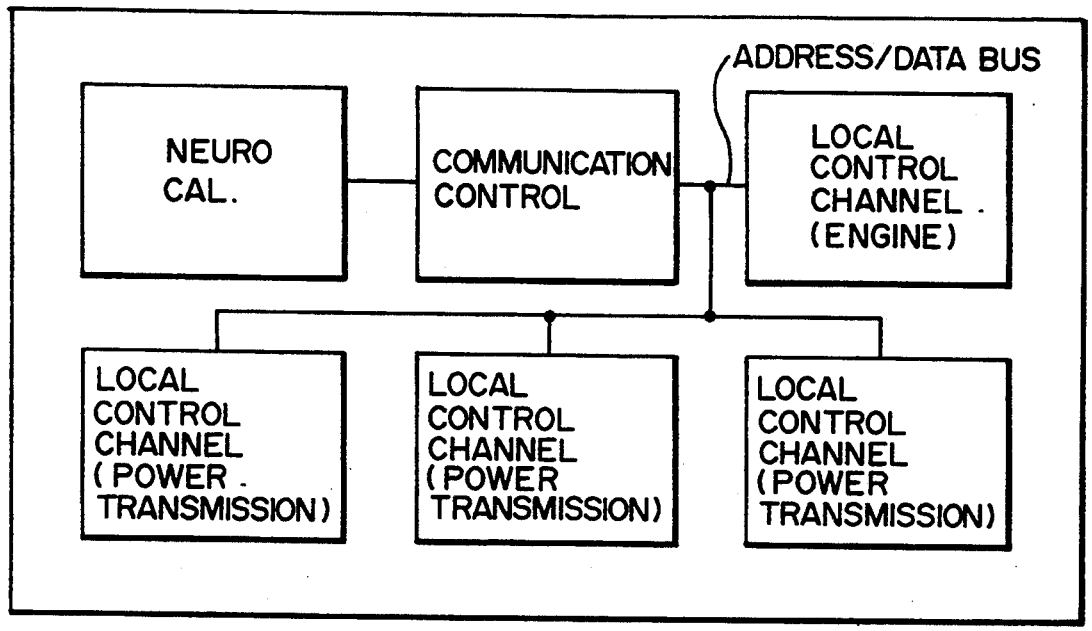

FIG. 29 shows another hardware construction. In this case, the local control channels are arranged on the common chip. As well, the driving environment index predicting section is also provided on the same chip. With such construction, the engine control, transmission control and so forth can be related more tightly and permits more efficient control without delay. Furthermore, with such construction, a common memory can be easily established so as to allow more effective co-relation between different control channels.

Figure 30:
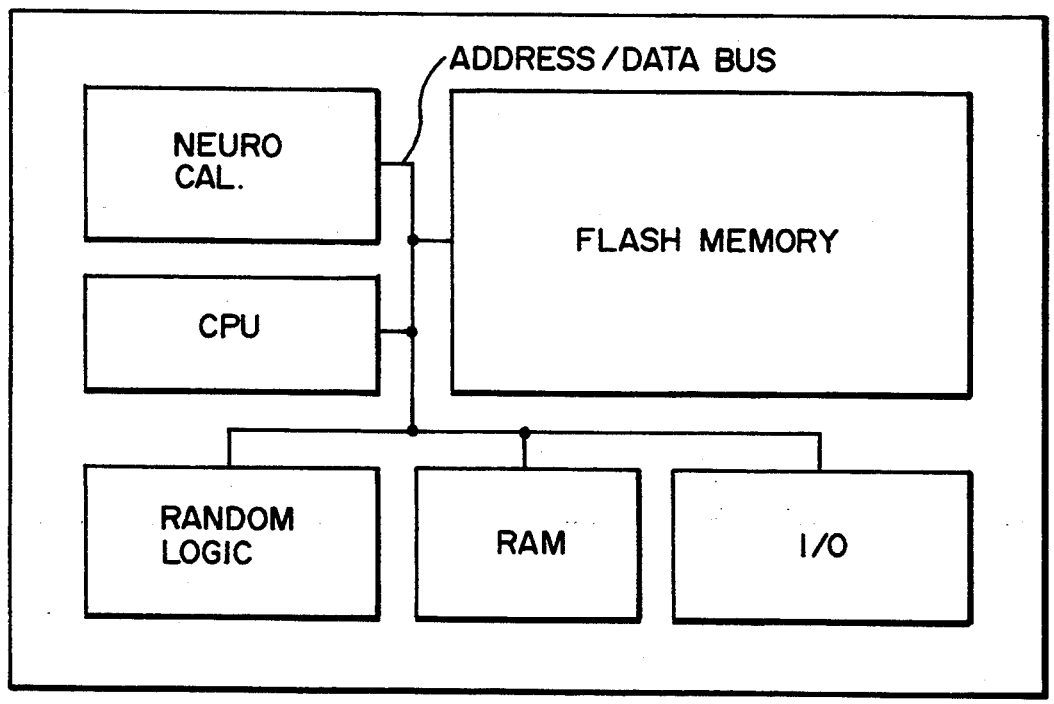

FIG. 30 shows a modification, in which a flush memory is employed in place of ROM in the embodiment of FIG. 28. The flush memory facilitating re-writing of the data by appropriately separating the contents. Therefore, this memory is suitable for changing weighting values of neuron. Namely, the flush memory is advantages in capability of holding data even after shutting down of the power supply and in capability of easily re-writing the data. Therefore, this type of memory is also advantageous for on-line learning of neuron, it may compensate the defect of the RAM with battery back-up.

Figure 31:
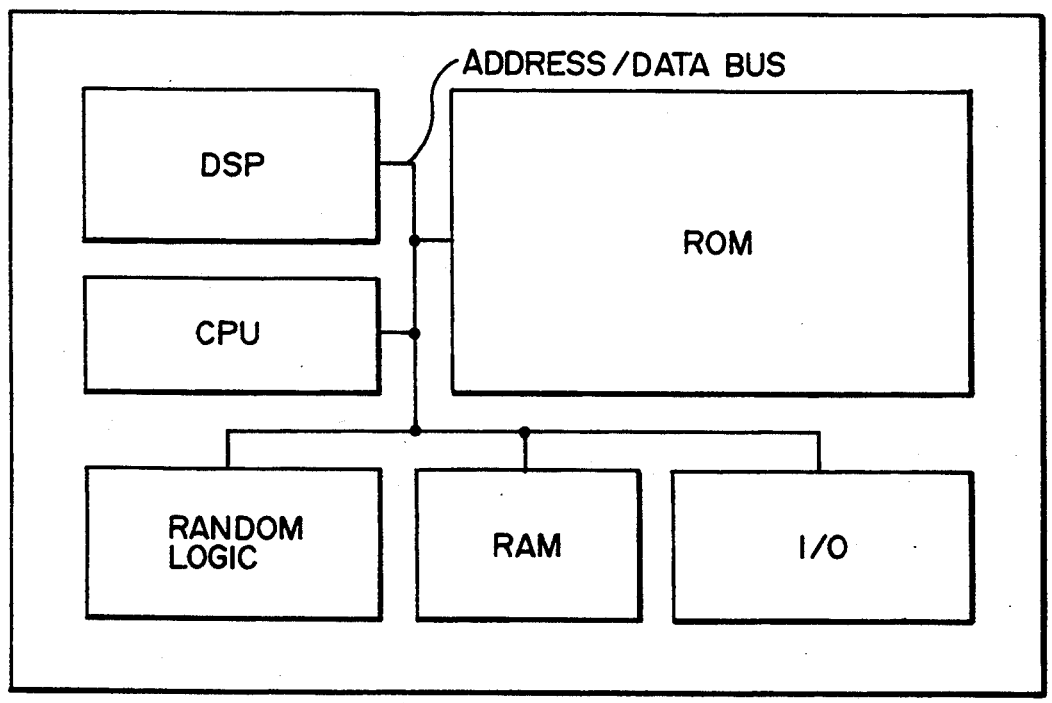

FIG. 31 shows another modification, in which digital signal processor (DSP) is incorporated for realizing neuron. The neuron which performs large volume of product sum operation can be realized with DSP.

Figure 32:
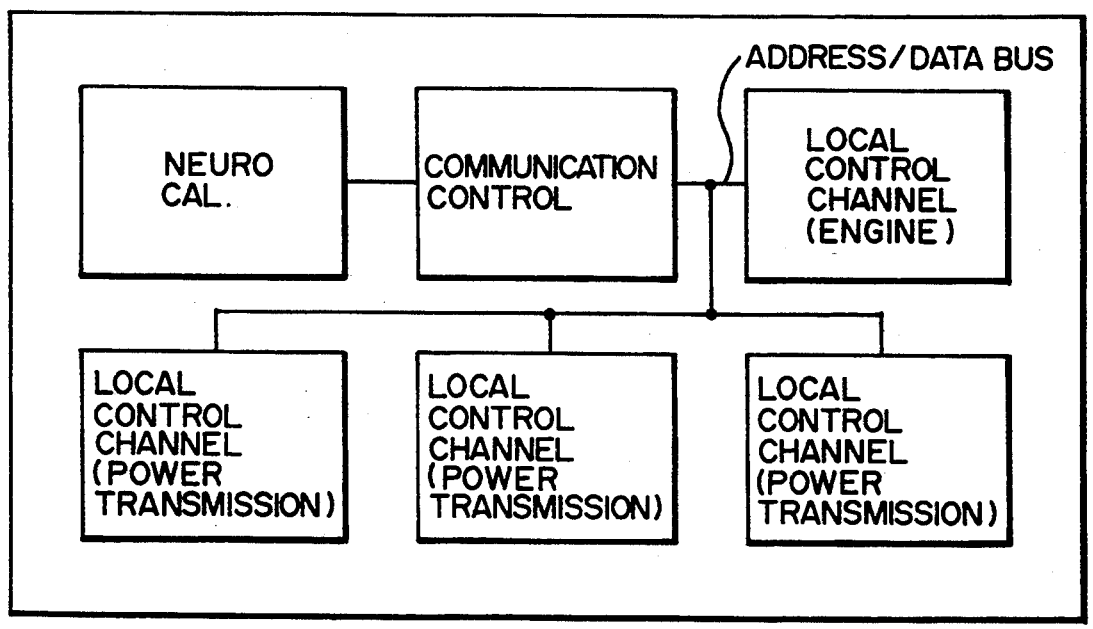

FIG. 32 shows an example, in which the construction of FIG. 29 is mounted on one board. With this construction, effective control become possible with using the common memory. Furthermore, this can solve the problem of pin neck of the chip.

As set forth above, according to the present invention, since the driving environment index is introduced in control of respective local control channels of the automotive vehicle, proper controls can be constantly performed even in the channel having non-linear characteristics. Therefore, it becomes possible to perform correlated control in almost all of the local control channels relative to each other for provided optimum vehicular behavior.

What is claimed is:

1. A control system for an automotive vehicle, comprising:
   a plurality of sub-systems for controlling operation of one of a driving system and a suspension system of the automotive vehicle on the basis of driving indexes corresponding to said plurality of sub-systems each being independent of each other;
   a plurality of driving-operations detecting means for detecting driver's driving operations and outputting first signals indicative of the driving operations respectively;
   a plurality of state detecting means for detecting driving states, wherein said driving states comprise at least one of vehicle speed and coolant temperature of the automotive vehicle that change in response to the driving operations and outputting second signals indicative of the states respectively;
   trigger signal generation means for, in response to a change in at least one of said first and second signals exceeding a predetermined value, generating a trigger signal;
   sampling means, responsive to said trigger signal, for sampling at least one of said first and second signals to obtain a predetermined number of time-series sampling signal values; and
   driving environment index predicting means for predicting a driving environment index on the basis of a dynamic pattern of said time-series sampling signal values received from said sampling means,
   wherein said predicted driving, environment index is provided to at least one of said sub-systems to control the sub-system and to control the associated vehicle operation;
   wherein said driving environment index predicting means includes a neural network; and
   wherein said sub-system, said driving environment indexing means and neural network are mounted on one chip.

2. A control system for an automotive vehicle, comprising:
   a plurality of local control channels for controlling operation of one of a driving System and a suspension system of the automotive vehicle on the basis of driving indexes corresponding to said plurality of local control channels each being independent of each other;
   a plurality of driving-operations detecting means for detecting driver's driving operations and outputting first signals indicative of the driving operations respectively;
   a plurality of state detecting means for detecting driving states, wherein said driving states comprise at least one of vehicle speed and coolant temperature of the automotive vehicle that change in response to the driving operations and outputting second signals indicative of the states respectively;
   trigger signal generation means, in response to a change in at least one of said first and second signals exceeding a predetermined value, generating a trigger signal;
   sampling means, responsive to said trigger signal, for sampling at least one of said first and second signals to obtain a predetermined number of time-series sampling signal values; and
   driving environment index predicting means for predicting a driving environment index on the basis of a dynamic pattern of said time-series sampling signal values received from said sampling means,
   wherein said predicted driving environment index is provided to at least one of said local control channels to control the local control channel and to control the associated vehicle operation.

3. A total control system as set forth in claim 2, wherein said driving environment index generated by said driving environment index predicting means is supplied to at least one of said local control channels as the control signal through at least one of a data bus, a communication network and a memory.

4. A total control system as set forth in claim 2, further comprising:
   memory means for storing said driving environment indexes generated by said driving environment index predicting means; and
   activity analyzing means for performing analysis of activity of said local control channels, said activity analyzing means performs analysis with reference to a driving environment index read out from said memory means.

5. A total control system as set forth in claim 2, wherein said driving environment index predicting means includes a prediction processing section established based on fuzzy logic.

6. A control system according to claim 2, wherein said driving environment index predicting means includes a neural network.

7. A control system according to claim 2, further comprising:
   pre-processing means for receiving at least one of said first and second signals, and wherein an output of said pre-processing means is supplied to said trigger signal generation means.

8. A control system according to claim 2, wherein one of said plurality of driving-operations detecting means includes means for detecting a throttle valve opening angle as one of said driving operations and outputting a signal indicative of said throttle valve opening angle, said trigger means outputs said trigger signal on the basis of said signal indicative of the throttle valve opening angle, one of said plurality of state detecting means includes means for detecting a vehicle speed as one of said states of the automotive vehicle, said sampling means differentiates and samples the vehicle speed detected by said vehicle speed detecting means in response to said trigger signal based on said second signal and also samples said signal indicative of the throttle valve opening angle in response to said trigger signal based on said first signal, and said driving environment index predicting means predicts a vehicle weight of said automotive vehicle as said driving environment index on the basis of said dynamic pattern of the time-series sampling signal values of a differentiated value of the vehicle speed sampled by said sampling means and a dynamic pattern of time-series sampling signal values of said sampled signal indicative of the throttle valve opening angle.

9. A control system according to claim 2, wherein one of said plurality of driving-operations detecting means includes means for detecting a throttle valve opening angle as one of said driving operations and outputting a signal indicative of said throttle valve opening angle, said trigger means outputs said trigger signal on the basis of said signal indicative of the throttle valve opening angle, one of said plurality of state detecting means includes means for detecting a vehicle acceleration as one of said states of the automotive vehicle, said sampling samples the vehicle acceleration detected by said acceleration detecting means in response to said trigger signal based on said second signal and also samples said signal indicative of the throttle valve opening angle in response to said trigger signal based on said first signal, and said driving environment index predicting means predicts a vehicle weight of said automotive vehicle as a driving environment index on the basis of said dynamic pattern of the time-series sampling signal values of the vehicle acceleration sampled by said sampling means and a dynamic pattern of time-series sampling signal values of said sampled signal indicative of the throttle valve opening angle.

10. A control system according to claim 2, wherein one of said plurality of driving-operations detecting means includes means for detecting a throttle valve opening angle as one of said driving operations and outputting a signal indicative of said throttle valve opening angle, said trigger means outputs said trigger signal on the basis of said signal indicative of the throttle valve opening angle, one of said plurality of state detecting means includes means for detecting a vehicle acceleration as one of said states of the automotive vehicle, said sampling means samples the vehicle acceleration detected by said acceleration detecting means and also samples said signal indicative of the throttle valve opening angle, and said driving environment index predicting means includes a vehicle weight of said automotive vehicle as a driving environment index on the basis of said dynamic pattern of the time-series sampling signal values of the vehicle acceleration sampled by said sampling means and a dynamic pattern of time-series sampling signal values of said sampled signal indicative of the throttle valve opening angle.

11. A control system according to claim 2, wherein one of said plurality of local control channels is a transmission which shifts according to a shift line thereof on the basis of the vehicle weight, as a driving environment index received from said driving environment index predicting means.

12. A control system according to claim 2, wherein one of said plurality of driving-operations detecting means includes means for detecting a throttle valve opening angle as one of said driving operations and outputting a signal indicative of said throttle valve opening angle, said trigger means outputs said trigger signal on the basis of said signal indicative of the throttle valve opening angle, one of said plurality of state detecting means includes means for detecting an engine speed as one of said states of the automotive vehicle, one of said plurality of state detecting means includes means for detecting a basic amount of fuel injection to an engine as one of said states of the automotive vehicle, said sampling means the basic fuel injection amount detected by said basic fuel injection amount detecting means, samples the engine speed detected by said engine speed detecting means in response to said trigger signal based on said second signal and also samples said signal indicating of the throttle valve opening angle in response to said trigger signal based on said first signal, and said driving environment index predicting means predicts an acceleration/deceleration amount of said automotive vehicle as a driving environment index on the basis of said dynamic pattern of the time-series sampling signal values of the basic fuel injection amount sampled by said sampling means, a dynamic pattern of time-series sampling signal values of the sampled engine speed, and a dynamic pattern of time-series sampling signal values of said sampled signal indicative of the throttle valve opening angle.

13. A control system according to claim 2, wherein one of said plurality of driving-operations detecting means includes means for detecting a throttle valve opening angle as one of said driving operations and outputting a signal indicative of said throttle valve opening angle, another one of said plurality of driving operation detecting means includes means for detecting a steering wheel angle as one of said driving operations and outputting a signal indicative of said steering wheel angle, said trigger means outputs said trigger signal on the basis of said signal indicative of the throttle valve opening angle, one of said plurality of state detecting means includes means for detecting an engine speed as one of said states of the automotive vehicle, said sampling means samples the steering wheel angle detected by said steering wheel angle detecting means, samples the engine speed detected by said engine speed detecting means in response to said trigger signal based on said second signal and also samples said signal indicative of the throttle valve opening angle in response to said trigger signal based on said first signal, and said driving environment index predicting means predicts a turning amount of said automotive vehicle as a driving environment index on the basis of a dynamic pattern of time-series sampling signal values of the steering wheel angle sampled by said sampling means, a dynamic pattern of time-series sampling signal values of the sampled engine speed, and a dynamic pattern of time-series sampling signal values of said sampled signal indicative of the throttle valve opening angle.

14. A control system according to claim 13, wherein one and another one of said plurality of local control channels are a transmission and an engine which are controlled on the basis of said vehicle turning amount as a driving environment index received from said driving environment index predicting means.

15. A control system according to claim 2, wherein one of said plurality of driving-operations detecting means includes means for detecting a throttle valve opening angle as one of said driving operations and outputting a signal indicative of said throttle valve opening angle, one of said plurality of state detecting means includes means for detecting a gear position of a transmission as one of said states of the automotive vehicle, another one of said plurality of driving state detecting means includes means for detecting a vehicle speed as one of said states of the automotive vehicle, said sampling means samples the gear position detected by said gear position detecting means, samples the engine speed detected by said engine speed detecting means in response to said trigger signal based on said second signal and also samples said signal indicative of the throttle valve opening angle in response to said trigger signal based on said first Signal, and said driving environment index predicting means predicts a slope angle of an ascending road on which the vehicle is running as a driving environment index on the basis of a dynamic pattern of time-series sampling signal values of the gear position sampled by said sampling means, a dynamic pattern of time-series sampling signal values of the sampled engine speed, and a dynamic pattern of time-series sampling signal values of said sampled signal indicative of the throttle valve opening angle.

16. A control system according to claim 2, wherein one of said plurality of driving-operations detecting means includes means for detecting a throttle valve opening angle as one of said driving operations and outputting a signal indicative of said throttle valve opening angle, another one of said plurality of driving-operations detecting means includes means for detecting a brake pedal depression angle as one of said driving operations and outputting a signal indicative of said brake pedal angle, said trigger means outputs said trigger signal on the basis of said signal indicative of the throttle valve opening angle, one of said plurality of state detecting means includes means for detecting a gear position or a transmission as one of said states of the automotive vehicle, another one of said plurality of state detecting means includes means for detecting a speed of said automotive vehicle as one of said vehicle states, said sampling means samples the gear position detected by said gear position detecting means, samples the brake pedal angle detected by said brake pedal angle detecting means in response to said trigger signal based on said second signal, and also samples said signal indicative of the throttle valve opening angle in response to said trigger signal based on said first signal, and said driving environment index predicting means predicts a descending slope angle of a road on which the vehicle is running as a driving environment index on the basis of a dynamic pattern of time-series sampling signal values of the gear position sampled by said sampling means, a dynamic pattern of time-series sampling signal values of the sampled brake pedal angle, a dynamic pattern of time-series sampling signal values of the sampled engine speed, and a dynamic pattern of time-series sampling signal values of said sampled signal indicative of the throttle valve opening angle.

17. A control system for an automotive vehicle, comprising:
a plurality of sub-systems for controlling operation of one of a driving system and a suspension system of the automotive vehicle on the basis of driving indexes corresponding to said plurality of subsystems each being independent of each other;
a plurality of driving-operations detecting means for detecting driver's driving operations and outputting first signals indicative of the driving operations respectively;
a plurality of state detecting means for detecting driving states, wherein said driving states comprise at least one of vehicle speed and coolant temperature of the automotive vehicle that change in response to the driving operations and outputting second signals indicative o the states respectively;
trigger signal generation means for, in response to change in at least one of said first and second signals exceeding a predetermined value, generating a trigger signal;
sampling means, responsive to said trigger signal, for sampling at least one of said first and second signals to obtain a predetermined number of time-series sampling signal values; and
driving environment index predicting means for predicting a driving environment index on the basis of a dynamic pattern of said time-series sampling signal values received from said sampling means,
wherein said predicted driving environment index is provided to at least one of said subsystems to control the sub-system and to control the associated vehicle operation.

18. A control system according to claim 17, wherein said driving environment index predicting means includes a neural network.

19. A control system according to claim 17, further comprising:
pre-processing means for receiving at least one of said first and second signals, and wherein an output of said pre-processing means is supplied to said trigger signal generation means.

* * * * *